(12) United States Patent
Suzuki

(10) Patent No.: US 8,451,544 B2
(45) Date of Patent: May 28, 2013

(54) LENS BARREL

(75) Inventor: Toshiharu Suzuki, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/433,691

(22) Filed: Mar. 29, 2012

(65) Prior Publication Data

US 2012/0257291 A1    Oct. 11, 2012

(30) Foreign Application Priority Data

Apr. 5, 2011 (JP) ................................. 2011-083983

(51) Int. Cl.
*G02B 15/14* (2006.01)

(52) U.S. Cl.
USPC .......................................................... 359/704

(58) Field of Classification Search
USPC ................. 359/673–675, 694, 695, 703, 704, 359/813, 817; 396/349, 350
See application file for complete search history.

(56) References Cited

U.S. PATENT DOCUMENTS

| | | | |
|---|---|---|---|
| 6,853,500 B2 | 2/2005 | Nomura et al. | |
| 6,888,685 B2 | 5/2005 | Nomura et al. | |
| 6,978,089 B2 * | 12/2005 | Nomura et al. | ................. 396/75 |
| 7,013,081 B2 | 3/2006 | Nomura et al. | |
| 7,058,293 B2 | 6/2006 | Nomura | |
| 7,106,961 B2 | 9/2006 | Nomura | |
| 7,289,725 B2 | 10/2007 | Nomura | |
| 7,338,219 B2 | 3/2008 | Ishizuka et al. | |
| 7,507,040 B2 | 3/2009 | Nomura et al. | |
| 7,546,029 B2 | 6/2009 | Ishizuka et al. | |
| 7,672,579 B2 | 3/2010 | Nomura | |
| 7,773,313 B2 | 8/2010 | Ishizuka et al. | |
| 8,059,953 B2 | 11/2011 | Nomura | |
| 2003/0156832 A1 | 8/2003 | Nomura et al. | |

FOREIGN PATENT DOCUMENTS

| | | |
|---|---|---|
| JP | 3771909 B2 | 2/2006 |
| JP | 4520171 B2 | 5/2010 |

OTHER PUBLICATIONS

U.S. Appl. No. 13/352,564 to Shinya Suzuka, which was filed Jan. 18, 2012.
U.S. Appl. No. 13/372,955 to Shinya Suzuka, which was filed Feb. 14, 2012.

* cited by examiner

*Primary Examiner* — Joseph P Martinez
(74) *Attorney, Agent, or Firm* — Greenblum & Bernstein, P.L.C.

(57) ABSTRACT

A lens barrel includes a rear movable member holding a rear optical element, an off-axis removable member holding a removable optical element, a front movable member supporting the off-axis removable member, and a removal driving member supported by the front movable member. When the front and rear movable members are at the photographing positions, the removable optical element is positioned in front of the rear optical element, and when the front and rear movable members are at the retracted accommodating positions, the removable optical element overlaps the rear optical element. When the front and rear movable members relatively move rearward, the removal driving member contacts the rear movable member to be slidable in a driven direction of the off-axis removable member while the off-axis removable member does not contact the rear movable member.

9 Claims, 27 Drawing Sheets

LENS BARREL

BACKGROUND OF THE INVENTION

1. Field of the Invention

The present invention relates to a lens barrel having an optical element, which is positioned on the optical axis in a ready-to-photograph state, and which also is removed from the optical axis in an accommodated state.

2. Description of the Related Art

In a known type of lens barrel in which the length thereof is made shorter in the optical axis direction when the lens barrel is in an accommodated state, in order to achieve a shorter barrel length, a lens barrel in which the imaging optical system thereof includes a removable optical element (radially-removable optical element) has been proposed. When this known type of lens barrel is in a ready-to-photograph state, the removable optical element is positioned on the optical axis, and when the lens barrel is in the accommodated state, the removable optical element is removed from the optical axis and carries out the accommodating operation. This lens barrel is disclosed in Japanese patent No. 3,771,909. Furthermore, the inventor has also proposed an evacuation mechanism that prevents interference of the removable optical element with other optical elements during accommodating operation of this type of lens barrel. This evacuation mechanism is disclosed in Japanese patent No. 4,520,171.

According to Japanese patent No. 4,520,171, an off-axis removable member that holds a removable optical element is provided, and a rear movable member that holds a rear optical element which is positioned at the rear of the removable optical element in the ready-to-photograph state is also provided. Each of these movable members (the off-axis removable member and the rear movable member) is provided with a contact surface capable of coming in contact with each other in an area other than that of each optical element. When the accommodating operation is carried out in a state wherein the rear movable member is positioned at any position that is closer to the front end of the lens barrel than a predetermined accommodating position in the optical axis direction, via the mutual contact of these contact surfaces, interference between the rear optical element and the off-axis removable member is prevented, and also interference of between the removable optical element and the rear movable member is prevented. In other words, the removing operation of the removable optical element is carried out by direct contact of these movable members that respectively hold the optical elements. However, the off-axis removable member, which holds the removable optical element, needs a more strict and accurate product quality control than the other holding (movable) members for ordinary optical elements that simply move in the optical axis direction only. Therefore, it is desirable for the load on the off-axis removable member to be as small as possible.

SUMMARY OF THE INVENTION

The present invention provides a lens barrel having an optical element that removes from a position on the optical axis in the accommodated state, which prevents interference between the optical element and other members during an accommodating operation, and which also reduces the load on an off-axis removable member that holds an removable optical element.

According to an aspect of the present invention, a lens barrel is provided, including a rear movable member, which holds a rear optical element of an imaging optical system, the rear movable member being movable along the optical axis of the imaging optical system between a photographing position and a retracted accommodating position that is positioned behind the photographing position; an off-axis removable member, which holds a removable optical element of the imaging optical system, the off-axis removable member being movable between an on-axis position at which the removable optical element is positioned on the optical axis and an off-axis position at which the removable optical element is positioned radially away from the optical axis; a front movable member, which supports the off-axis removable member, the front movable member being movable along the optical axis between a photographing position and a retracted accommodating position that is positioned behind the photographing position; and a removal driving member, which is supported by the front movable member, wherein the removal driving member makes the off-axis removable member position at the on-axis position when the front movable member is at the photographing position, and the removal driving member moves the off-axis removable member from the on-axis position to the off-axis position when the front movable member moves from the photographing position to the retracted accommodating position. When the front movable member and the rear movable member are respectively positioned at the photographing positions, the removable optical element is positioned in front of the rear optical element, and when the front movable member and the rear movable member are respectively positioned at the retracted accommodating positions, the removable optical element at least partially overlaps the rear optical element in the optical axis direction. The removal driving member is provided at the rear of the front movable member. When the front movable member moves rearward in the optical axis direction relative to the rear movable member, the removal driving member comes in contact with the rear movable member to be slidable in a driven direction of the off-axis removable member within a movable range of the off-axis removable member between the on-axis position and the off-axis position, while the off-axis removable member does not come in contact with the rear movable member.

It is desirable for the removal driving member to include a swing member which is supported by the front movable member and pivoted about an axis that is substantially parallel to the optical axis.

It is desirable for the removal driving member to include a linear movable member which is supported by the front movable member to be movable linearly in a direction that is substantially orthogonal to the optical axis.

It is desirable for the rear movable member to be provided with a holding frame which holds the rear optical element, and for the holding frame of the rear movable member to be provided with a contact portion which projects forwardly in the optical axis direction and is formed along a moving path of the removal driving member to be capable of coming in contact with the removal driving member.

It is desirable for the contact portion of the holding frame to include a flange portion projecting forwardly in the optical axis direction from a rim of the holding frame, and for the removal driving member to be provided with a rear flat surface that is substantially orthogonal to the optical axis and faces the flange portion of the rear movable member when the off-axis removable member moves from the on-axis position to the off-axis position.

It is desirable for the removal driving member not to coincide with the contact portion, as viewed in the optical axis direction, when the off-axis removable member is at the on-axis position so that the removal driving member does not prevent the off-axis removable member and the rear movable member from closely approaching each other in the optical axis direction. At least one of the removal driving member and the rear movable member is provided with a guide portion, wherein the guide portion guides the removal driving member to insert between the off-axis removable member and the rear movable member to a position so as to face the contact portion by widening a distance between the off-axis removable member and the rear movable member in the optical axis direction, when the removal driving member moves the off-axis removable member from the on-axis position toward the off-axis position in a state where the off-axis removable member and the rear movable member are positioned at the closest position to each other in the optical axis direction.

It is desirable for the guide portion to be provided with a tapered surface which is provided on the holding frame of the rear movable member, the tapered surface producing a component force to press the rear movable member rearward in the optical axis direction by movement of the removal driving member from one position, that makes the off-axis removable member position at the on-axis position, to another position, that makes said off-axis removable member position at the off-axis position.

It is desirable for one of the removal driving member and the off-axis removable member to be provided with a projection which projects in the optical axis direction, and for the other of the removal driving member and the off-axis removable member to be provided with a groove into which the projection is inserted so as to transmit a moving force in the direction orthogonal to the optical axis while not transmitting a moving force in the optical axis direction. A driving force from the removal driving member to the off-axis removable member is applied via the projection and the groove.

It is desirable for each of the removable optical element and the rear optical element to be a lens group.

The present invention may be applied to various types of optical elements, and it is desirable for the present invention to be applied to a lens barrel, in which removable optical element and a rear optical element constitute lens groups, respectively.

According to the lens barrel of the present invention, when the off-axis removable member moves from the on-axis position to the off-axis position during accommodating operation of the lens barrel, the rear movable member comes in contact with the removal driving member which drives that off-axis removable member rather than the off-axis removable member which holds the optical element, thereby reducing the load on the off-axis removable member.

The present disclosure relates to subject matter contained in Japanese Patent Application No. 2011-83983 (filed on Apr. 5, 2011) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
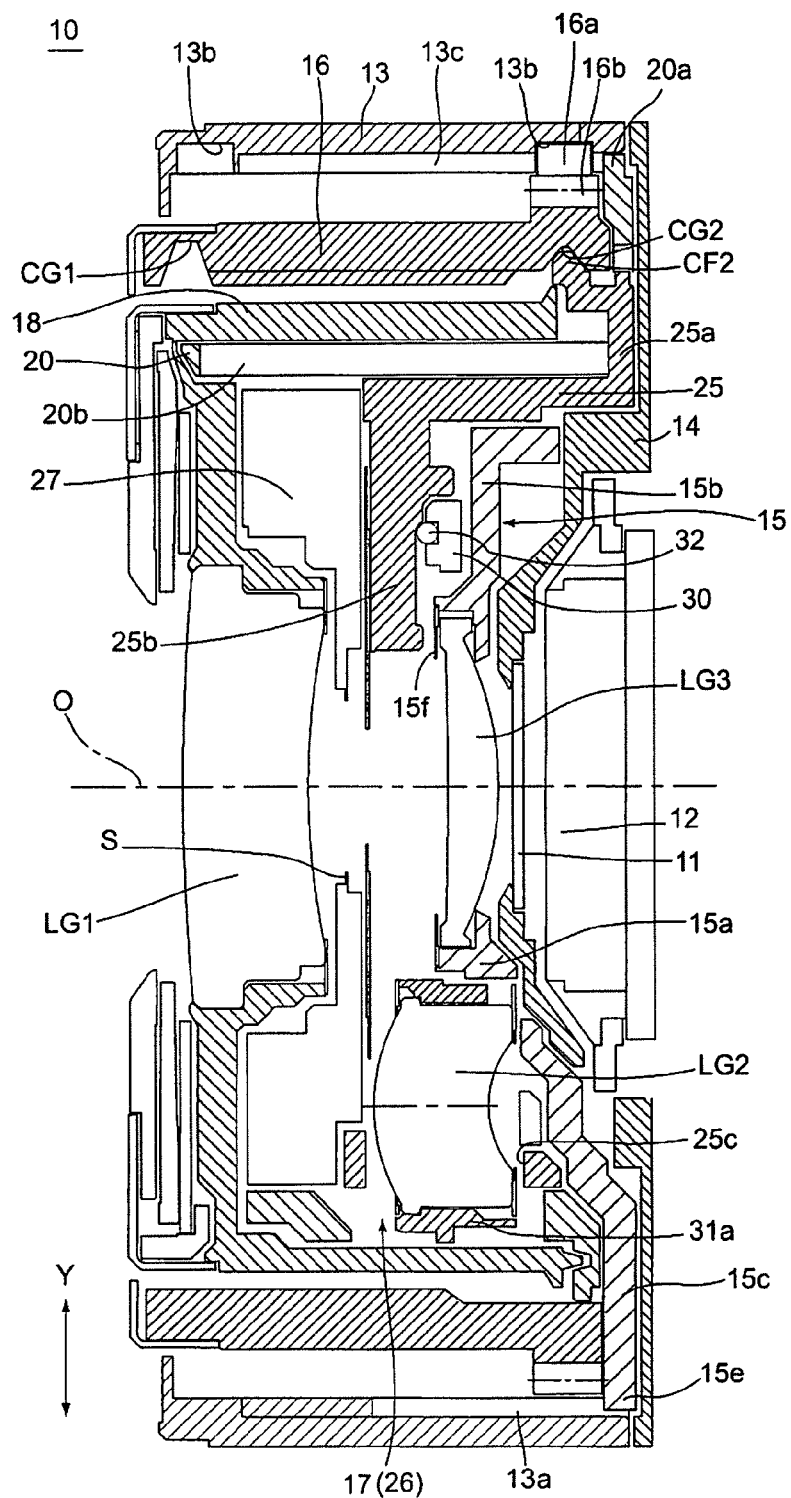
FIG. 1 is a cross sectional view of an embodiment of a zoom lens barrel according to the present invention, in an accommodated state (fully-retracted state)
Figure 2:
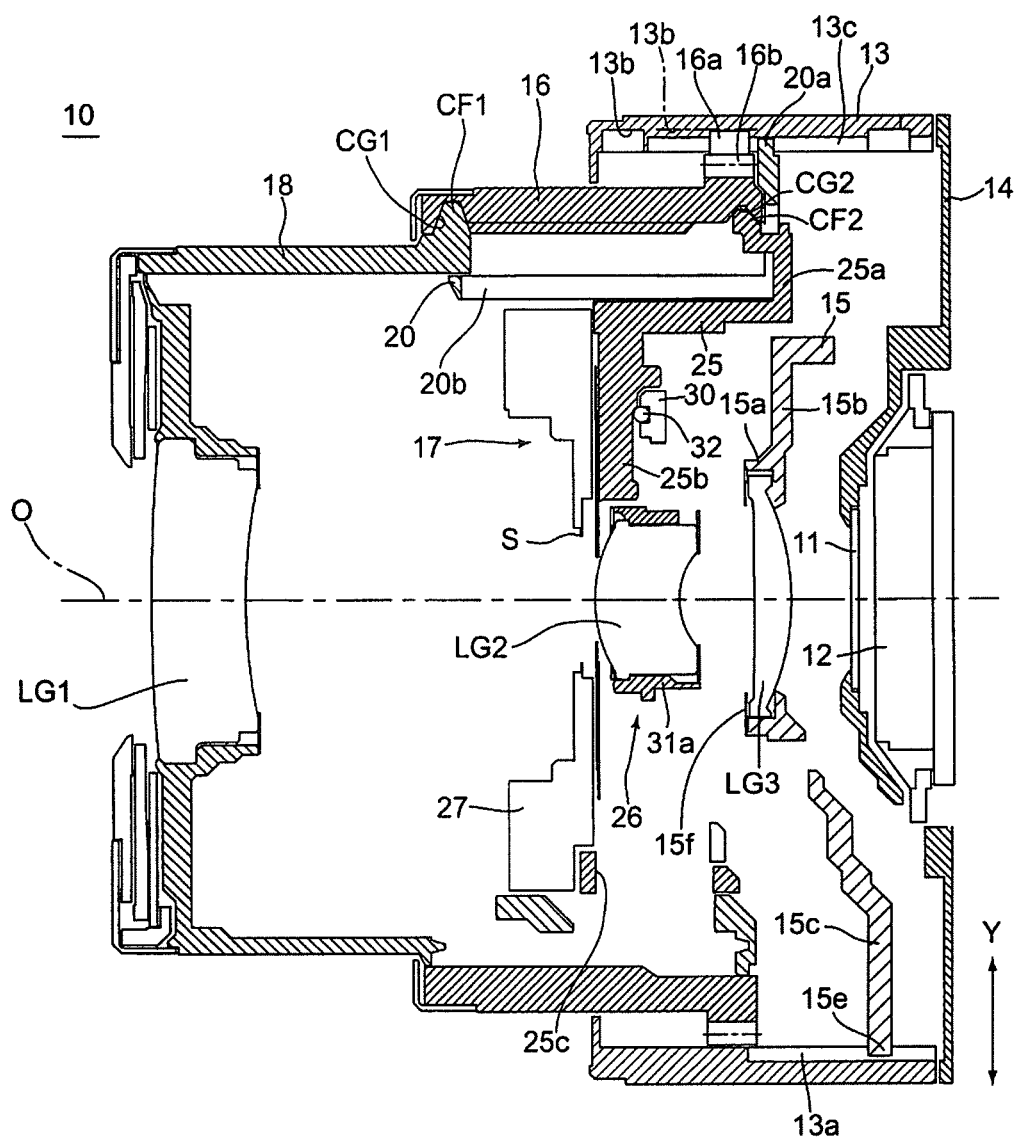
FIG. 2 is a cross sectional view of the zoom lens barrel at the wide-angle extremity of the zoom range.
Figure 3:
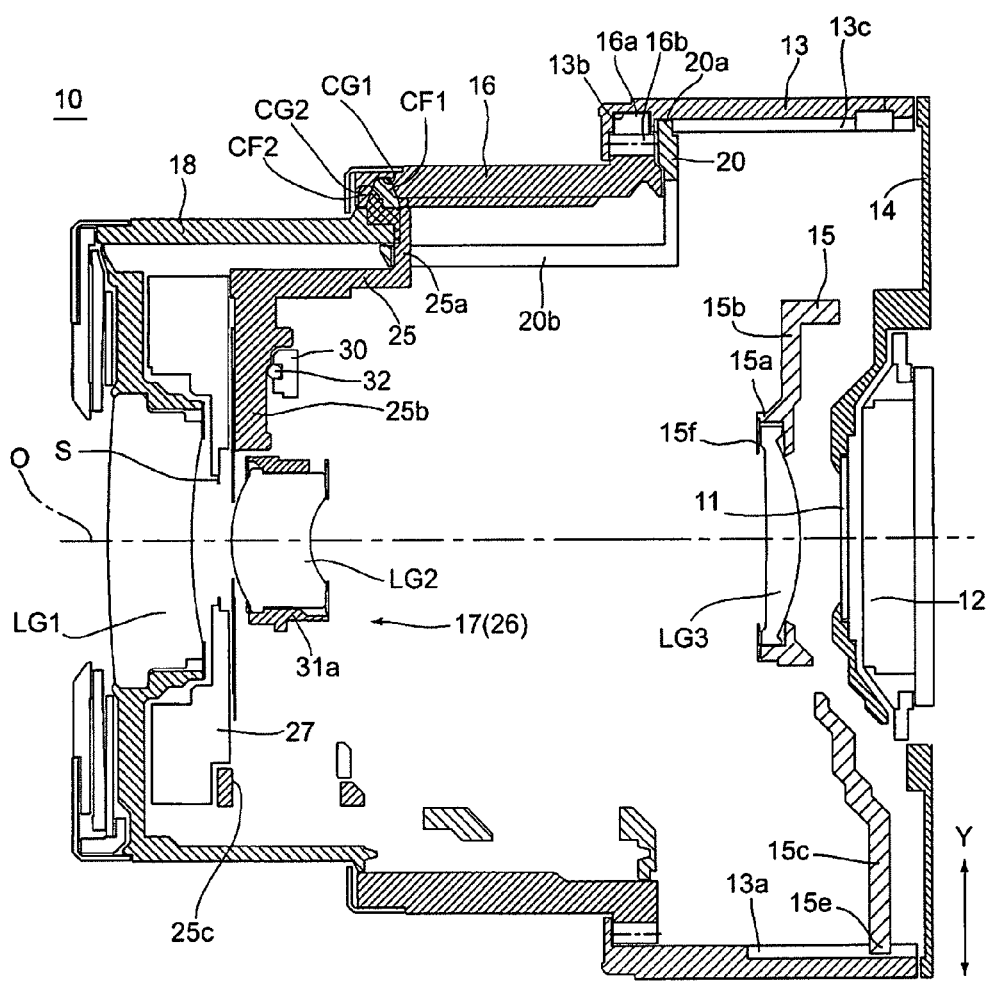
FIG. 3 is a cross sectional view of the zoom lens barrel at the telephoto extremity of the zoom range.

A retractable zoom lens barrel (zoom lens system) 10, cross sectional views of which are shown in FIGS. 1 through 3, is provided with an imaging optical system which includes a first lens group LG1, a shutter S, a second lens group (removable optical element) LG2, a third lens group (rear optical element) LG3, a low-pass filter 11 and an image sensor (image pickup device) 12, in that order from the object side. The imaging optical system is a zoom optical system that provides a variable focal length. A zooming operation is carried out by moving the first lens group LG1 and the second lens group LG2 along the optical axis O of the imaging optical system in a predetermined moving manner. A focusing operation is carried out by moving the third lens group LG3 along the optical axis O. In the following descriptions, the optical axis direction refers to a direction along or parallel to the optical axis O, and the front and the rear refer to the front (object side) and the rear (image plane side) with respect to the optical axis direction, respectively.

The zoom lens barrel 10 is provided with a cylindrical housing 13 that constitutes a stationary member. An image sensor holder 14 is fixed to the back of the housing 13. The lower-pass filter 11 and the image sensor 12 are supported by the image sensor holder 14.

Figure 4:
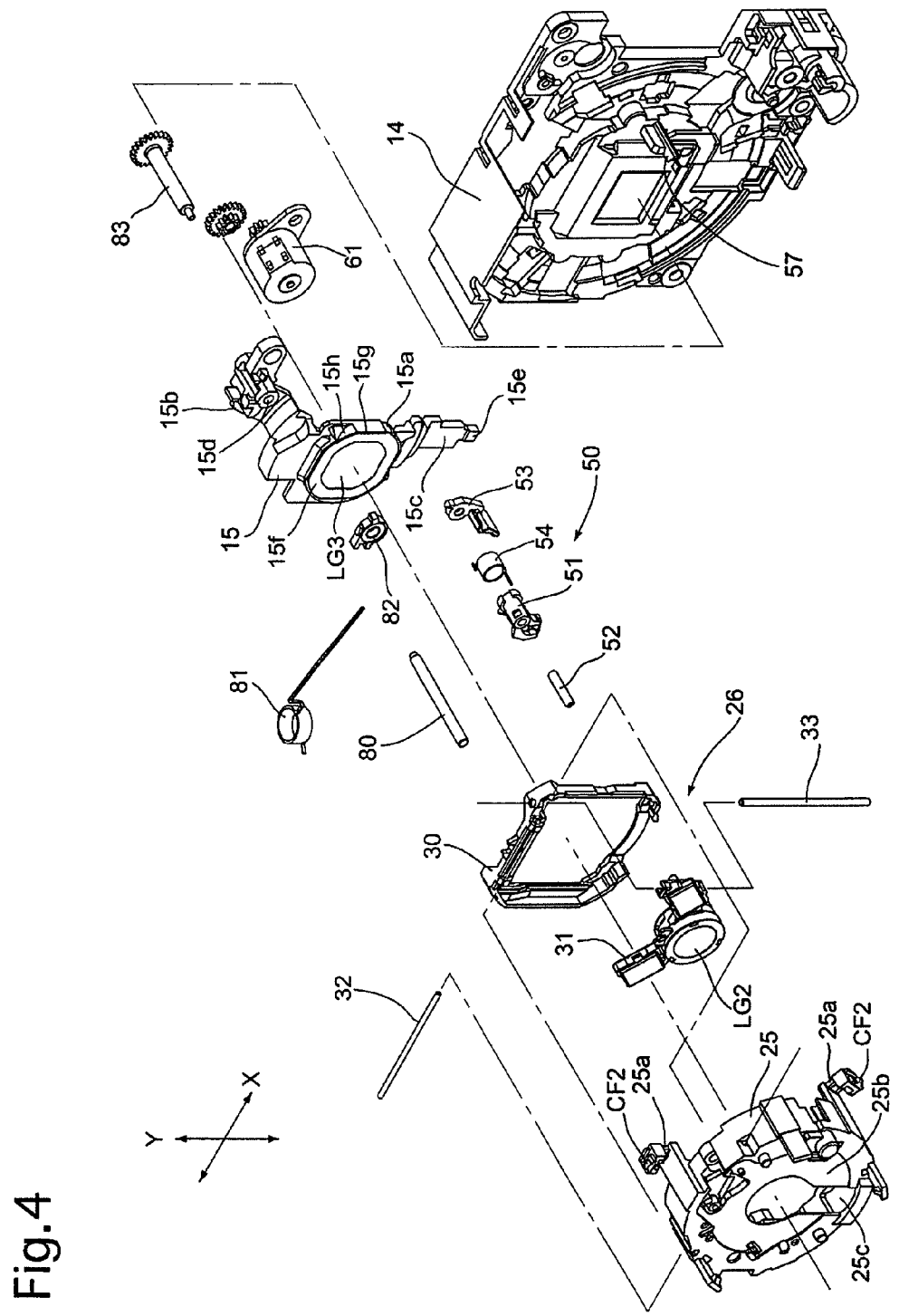
FIG. 4 is an exploded front perspective view of a support structure for the second lens group and the third lens group that serve as elements of an imaging optical system of the zoom lens barrel.
Figure 5:
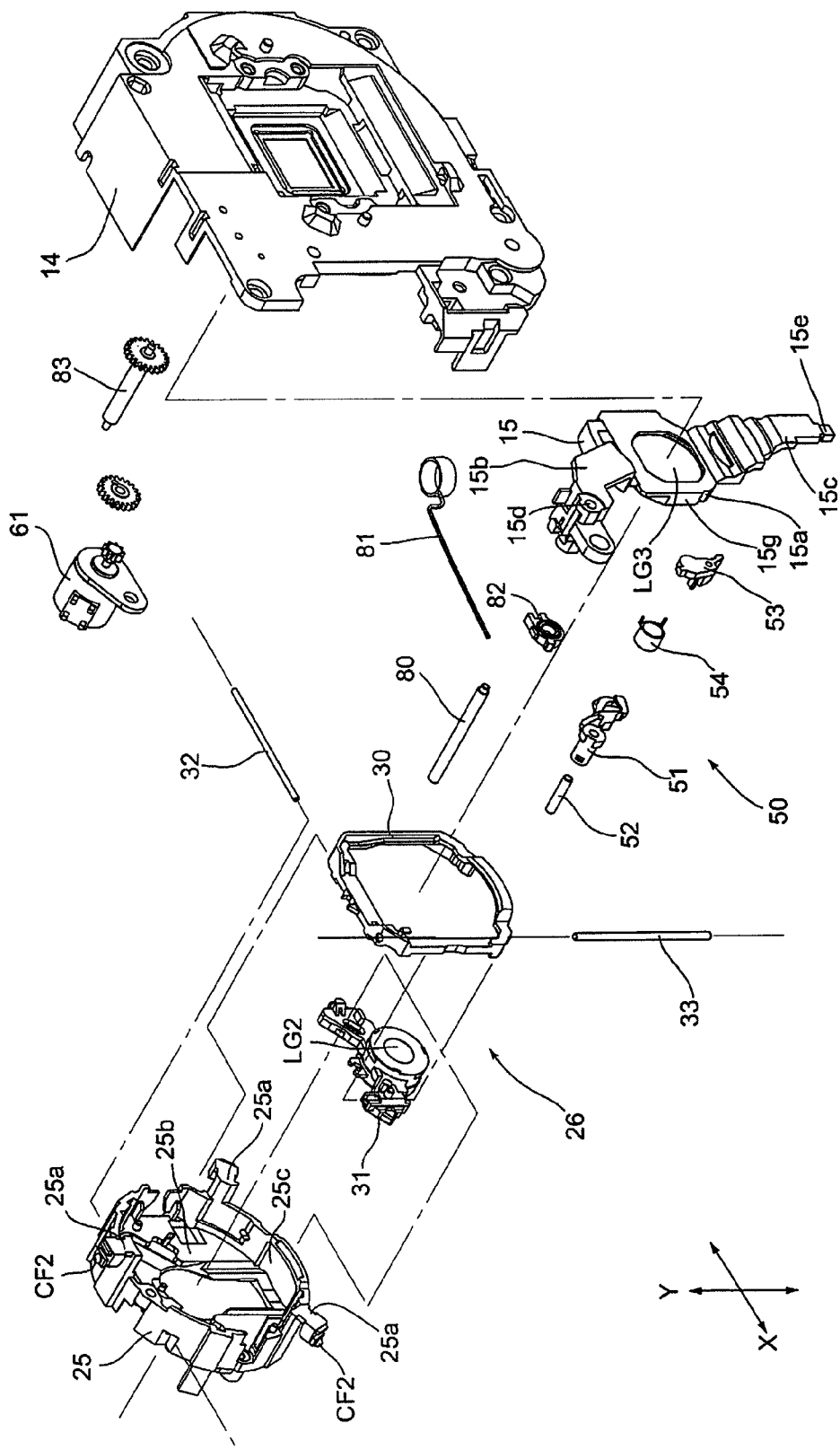
FIG. 5 is an exploded rear perspective view of the support structure for the second lens group and the third lens group that serve as the elements of the imaging optical system of the zoom lens barrel.
Figure 8:
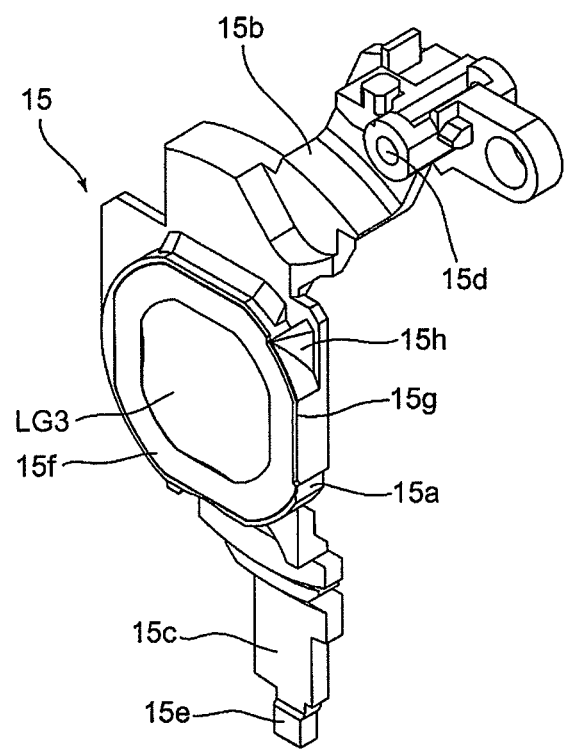
FIG. 8 is a front perspective view of a third lens group frame.

As shown in FIGS. 4, 5 and 8, the third lens group LG3 is supported by a lens holding frame 15a of a third lens group frame (rear movable member) 15. The third lens group frame 15 is provided with a pair of guide arms 15b and 15c, which project radially outwards from the lens holding frame 15a in the directions substantially opposite to each other. The guide arm 15b is provided with a guide hole 15d, into which a third lens group guide shaft 80 extends through. The respective ends of the third lens group guide shaft 80 are fixed to the housing 13 and the image sensor holder 14, whereby the third lens group frame 15 is supported via this third lens group guide shaft 80 to be linearly movable in the optical axis direction. The other guide arm 15c has a rotation stopper 15e at the outer end thereof, which is engaged in a rotation prevention groove 13a formed in the inner side of the housing 13, and thus the rotation of the third lens group frame 15 is thereby prevented. The third lens group frame 15 is biased forwardly in the optical axis direction by a third lens group biaser spring 81, and comes in contact with an AF nut 82, which prevents further forward movement of the third lens group frame 15. The AF nut is engaged in a lead screw 83, and when an AF motor 61, which is driven and controlled by a control circuit 60 (see FIG. 25), rotates the lead screw 83, the AF nut 82 moves in the optical axis direction.

A lens retaining frame 15f which prevents the third lend group LG3 from falling out the front side of the third lens group frame 15 is provided at the front of the lens holding frame 15a of the third lens group frame 15, and is positioned closer to the front in the optical axis direction than the incident surface of the third lens group LG3 (see FIGS. 1 through 3, and 17 through 20). The lens retaining frame 15f is in the shape of a frame surrounding the incident surface of the third lens group LG3 (the surface on the object side), and the front surface is a flat surface substantially orthogonal to the optical axis O. The third lens group frame 15 is also provided with a contact flange (contact portion) 15g, which is formed at the rim of the lens holding frame 15a and projects further forward than the lens retaining frame 15f. The incident surface of the third lens group LG3 is a concave surface, and when the third lens group LG3 is held inside the lens holding frame 15a, the third lens group LG3 has no portion projecting further forward than the lens retaining frame 15f or the contact flange 15g. A guide recess (guide portion) 15h formed at a position adjacent to the contact flange 15g. The guide recess 15h has a tapered surface (described afterwards).

A variable magnification lens-group unit (cam ring unit) is supported inside the housing 13 and provided separately from a support/driving device of the third lens group frame 15. The variable magnification lens-group unit is driven and controlled by a zoom motor 62 (see FIG. 25), and includes a first advancing barrel 16, a second lens-group unit 17, a second advancing barrel 18 and a linear guide ring 20.

The first advancing barrel 16 constitutes, together with the second advancing barrel 18, the exterior barrel of the zoom lens barrel 10, and has a guide projection 16a slidably fitted into a guide groove 13b formed on the inner peripheral surface of the housing 13. The zoom motor 62 drives to rotate a zoom gear (not shown) and the driving force thereof is received by a peripheral surface gear 16b, whereby the first advancing barrel 16 makes the rotation. When the zoom motor 62 drives to rotate the first advancing barrel 16, the guide projection 16a is guided by the guide groove 13b, whereby the first advancing barrel 16 rotationally moves in the optical axis direction. In particular, the first advancing barrel 16 rotationally moves forward in the optical axis direction during the transition from the accommodated (fully-retracted) state of FIG. 1 to the ready-to-photograph state (zoom range) of FIG. 2 or 3.

The linear guide ring 20 is guided to be movable linearly in the optical axis direction via the slidable engagement of a linear guide projection 20a with a linear guide groove 13c formed on the inner peripheral surface of the housing 13. The linear guide ring 20 and the first advancing barrel 16 are connected to each other to be relatively rotatable and also to be integrally movable in the optical axis direction.

The second lens-group unit 17 has a structure in which a second lens group support unit 26 and a shutter unit 27 are supported inside a second lens group movable ring (front movable member) 25, and is guided linearly in the optical axis direction by slidable engagements of linear guide keys 25a, respectively projecting outward in the radial directions from the second lens group movable ring 25, with corresponding linear guide slots 20b which are respectively provided in the linear guide ring 20 and each formed in the shape of a hole elongated in the optical axis direction. An interior flange 25b is formed on the inner side of the second lens group movable ring 25 and serves to divide the positional space between the second lens group support unit 26 and the shutter unit 27. The second lens group support unit 26 is provided at the rear of the interior flange 25b and supports the second lens group LG2 so that the second lens group LG2 is movable in a plane that is substantially orthogonal to the optical axis O, the details of which will be described afterwards. The shutter unit 27 is positioned in front of the interior flange 25b, and incorporates a shutter actuator 63 (see FIG. 25) for carrying out the opening/closing of the shutter S.

The second lens group movable ring 25 is provided with a plurality of second lens group cam followers CF2 which are slidably engaged with a plurality of second lens group control cam grooves CG2 formed in the inner peripheral surface of the first advancing barrel 16, respectively. Each of the second lens group cam followers CF2 is positioned at the radially outer end of the corresponding linear guide key 25a and projects, via the corresponding linear guide slot 20b extending through the linear guide ring 20 in the radial direction, into the engagement position with the second lens group control cam grooves CG2. The second lens group movable ring 25 (second lens-group unit 17) is linearly guided in the optical axis direction via the linear guide ring 20, and therefore, when the first advancing barrel 16 rotates, the second lens group movable ring 25 (second lens-group unit 17) moves in the optical axis direction in a predetermined moving manner in accordance with the profiles of the second lens group control cam grooves CG2.

The first lens group LG1 is supported in the second advancing barrel 18. The second advancing barrel 18 is provided with linear guide keys (not shown) on the inner peripheral surface thereof and are slidably engaged with respective linear guide grooves (not shown) formed in the linear guide ring 20 in the optical axis direction. Accordingly, the second advancing barrel 18 is linearly guided in the optical axis direction. A plurality of first lens group cam followers CF1 are provided at the rear end of the second advancing barrel 18. The first lens group cam followers CF1 are slidably engaged with corresponding first lens group control cam grooves CG1 which are respectively formed in the inner peripheral surface of the first advancing barrel 16. The second advancing barrel 18 is linearly guided in the optical axis direction via the linear guide ring 20, and hence, when the first advancing barrel 16 rotates, the second advancing barrel 18 moves in the optical axis direction in a predetermined moving manner in accordance with the profiles of the first lens group control cam grooves CG1.

The zoom lens barrel 10 is provided with an anti-shake device for reducing image shake of an image formed on the light receiving surface of the image sensor 12. The anti-shake device detects vibrations to the zoom lens barrel 10 by an X-gyro sensor 64 and a Y-gyro sensor 65 (see FIG. 25) and controls the operation of the second lens group support unit 26 to move the second lens group LG2 in directions orthogonal to the optical axis O in accordance with detection information obtained from the X-gyro sensor 64 and the Y-gyro sensor 65.

As shown in FIGS. 4 through 7, the second lens group support unit 26 is provided with a first movable stage 30 and a second movable stage (off-axis removable member) 31. The first movable stage 30 is supported by an X-guide shaft 32 to be slidable thereon. The X-guide shaft 32 is fixed to the second lens group movable ring 25 therein. The second movable stage 31 is supported by a Y-guide shaft 33 to be slidable thereon. The Y-guide shaft 33 is fixed to the first movable stage 30. The axis of the X-guide shaft 32 extends in a direction in a plane orthogonal to the optical axis O, while the axis of the Y-guide shaft 33 extends in another direction in the plane orthogonal to the optical axis O, in a manner that the X-guide shaft 32 and the Y-guide shaft 33 intersect each other in mutually orthogonal directions. The moving direction of the first movable stage 30, that is the axis direction of the X-guide shaft 32, will be hereinafter referred to as the X-direction (X-axis). Similarly, the moving direction of the second movable stage 31, that is the axis direction of the Y-guide shaft 33, will be hereinafter referred to as the Y-direction (Y-axis).

The first movable stage 30 is provided with an upper side portion 30a and a lower side portion 30b which are spaced from each other in the Y-direction and elongated in the X-direction, and is further provided with two lateral side portions 30c and 30d which are spaced from each other in the X-direction and elongated in the Y-direction. The first movable stage 30 is in the shape of a substantially rectangular frame having a stage opening 30e at a center thereof that is surrounded by the upper side portion 30a, the lower side portion 30b and the two lateral side portions 30c and 30d. The stage opening 30e has a size and a shape that allows the lens holding frame 15a of the third lens group frame 15 to enter therein. When the lens holding frame 15a is made to enter the stage opening 30e at a position adjacent to the upper side portion 30a, an empty space is secured between the lens holding frame 15a and the lower side portion 30b. The upper side portion 30a is provided thereon with an X-guide hole 30f which extends in the X-direction. The X-guide shaft 32 is slidably inserted through the X-guide hole 30f. The Y-guide shaft 33 is fixed to the first movable stage 30 at a position within the stage opening 30e alongside the lateral side portion 30c. The lower end of the Y-guide shaft 33 is supported to be movable in the X-direction relative to the inner side of the second lens group movable ring 25. With the above described structure, the first movable stage 30 is supported by the second lens group movable ring 25 to be movable in the X-direction relative to the second lens group movable ring 25.

The second movable stage 31 is provided with a cylindrical lens holder frame 31a for holding the second lens group LG2, and also with a pair of support arms 31b and 31c, which extend from the lens holder frame 31a obliquely upwards into a V-shape. The support arm 31b is provided with a Y-guide portion 31d at the upper end thereof. A guide hole is formed in the Y-guide portion 31d so that the Y-guide shaft 33 can slidably fit therein. The other support arm 31c is provided with a guide member 31e at the upper end thereof, which is slidably fitted in a guide rib 30g formed on the lateral side portion 30d of the first movable stage 30. The second movable stage 31 is guided and supported by the Y-guide shaft 33 to be movable in the Y-direction relative to the first movable stage 30. Due to this movement of the second movable stage 31 in the Y-direction, the second movable stage 31 varies the position thereof in the stage opening 30e of the first movable stage 30. The guide rib 30g and the guide member 31e controls the angle (prevents the rotation) of the second movable stage 31 around the axis of the Y-guide shaft 33.

Figure 25:
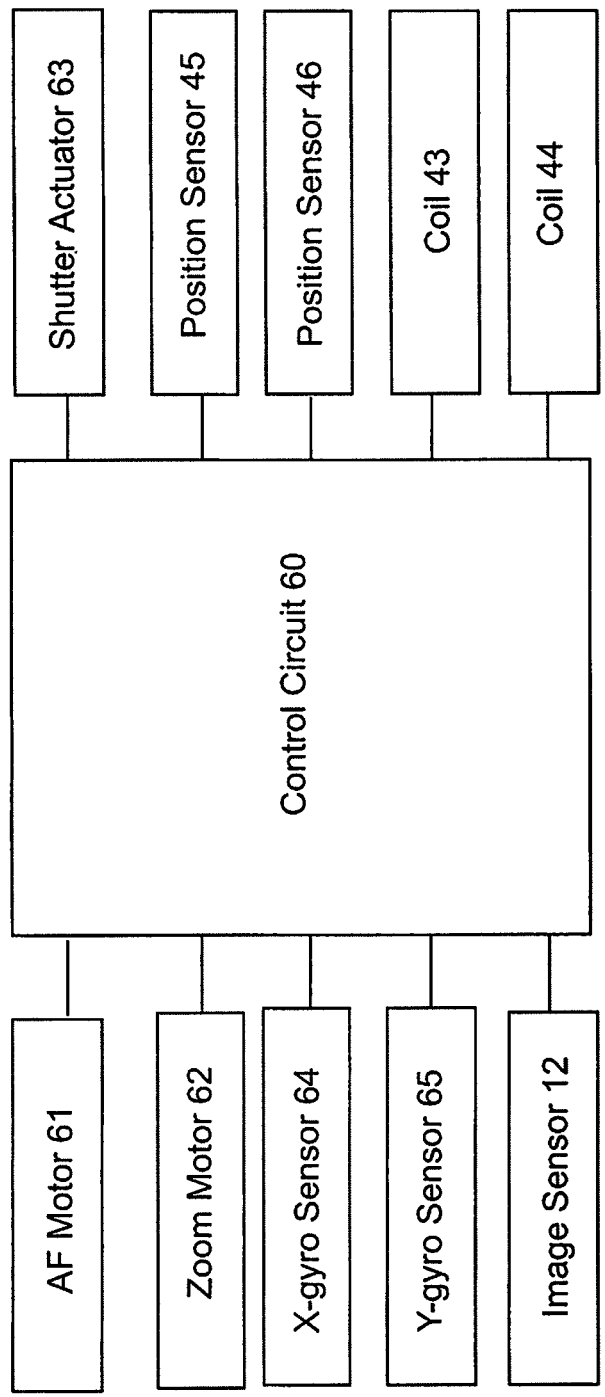
FIG. 25 is a schematic block diagram of a circuit configuration of the zoom lens barrel.

The first movable stage 30 and the second movable stage 31 are driven and controlled by an electromagnetic actuator comprising a pair of permanent magnets 41 and 42 and a pair of coils 43 and 44 (see FIG. 25). The permanent magnets 41 and 42 are respectively fixed to the support arms 31b and 31c of the second movable stage 31, and the coils 43 and 44 are fixed to the second lens group movable ring 25. Although a detailed illustration is not given, in the ready-to-photograph state of FIGS. 2 and 3, the permanent magnet 41 and the coil 43, as well as the permanent magnet 42 and the coil 44, are respectively facing each other in the optical axis direction. In such a state, upon the coils 43 and 44 being energized, a driving force is generated in reverse directions intersecting each other at an angle of approximately 45 degrees relative to the X-direction and the Y-direction, in a plane orthogonal to the optical axis O. Thus the first movable stage 30 and the second movable stage 31 can be freely moved in the X-direction and the Y-direction, respectively, by controlling the passage of current through each of the coils 43 and 44. The controllable range in which the position of the second lens group LG2 can be controlled by the electromagnetic actuator is herein referred to as the anti-shake driving position (on-axis position) of the second lens group LG2 (the second movable stage 31). When the second lens group LG2 is in the anti-shake driving position, the second lens group LG2 is in a predetermined range having its center on the optical axis O. The driving position of the second lens group LG2 by the electromagnetic actuator can be detected by a pair of position sensors 45 and 46 (see FIG. 25), and the detected position information is inputted in the control circuit 60.

Figure 9:
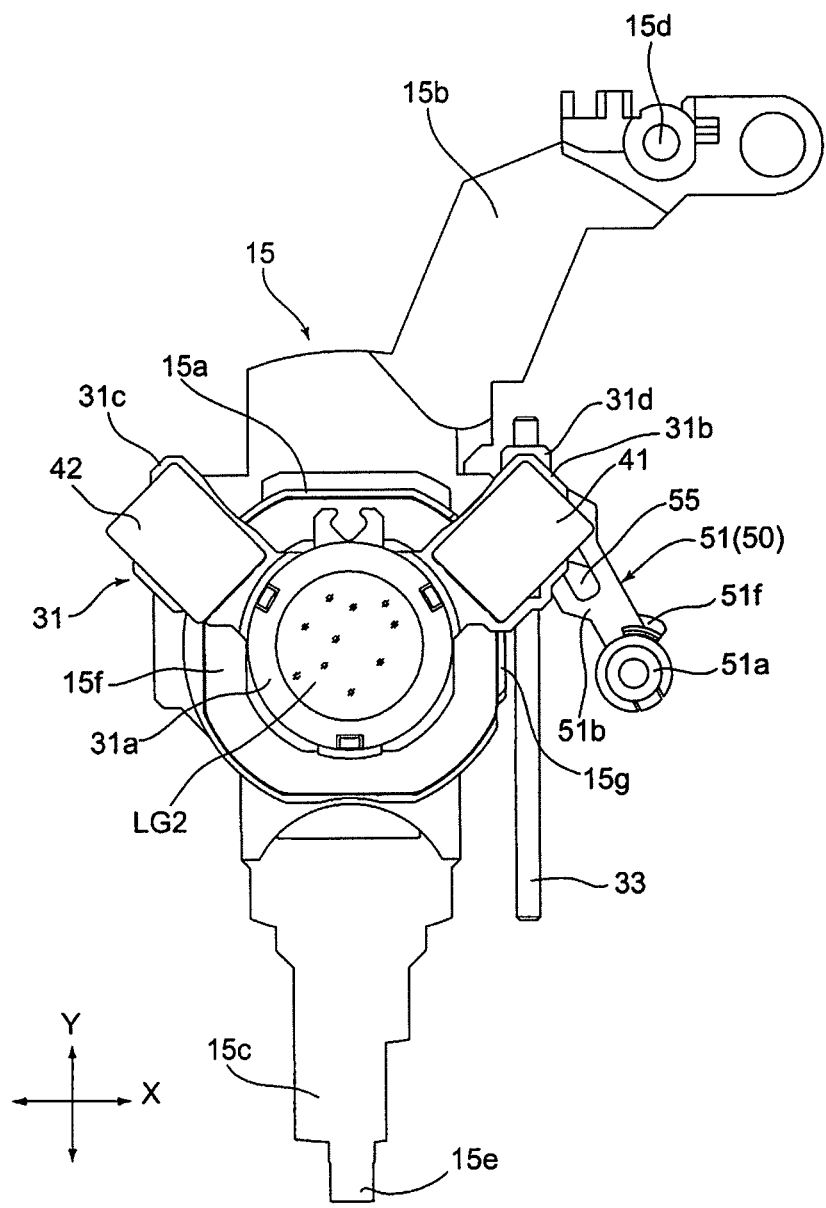
FIG. 9 is a front elevational view of the second lens group support unit, the third lens group frame and an insertion/removal-operation control lever, in transition from the ready-to-photograph state to the accommodated state, viewed from the front in the optical axis direction.
Figure 13:
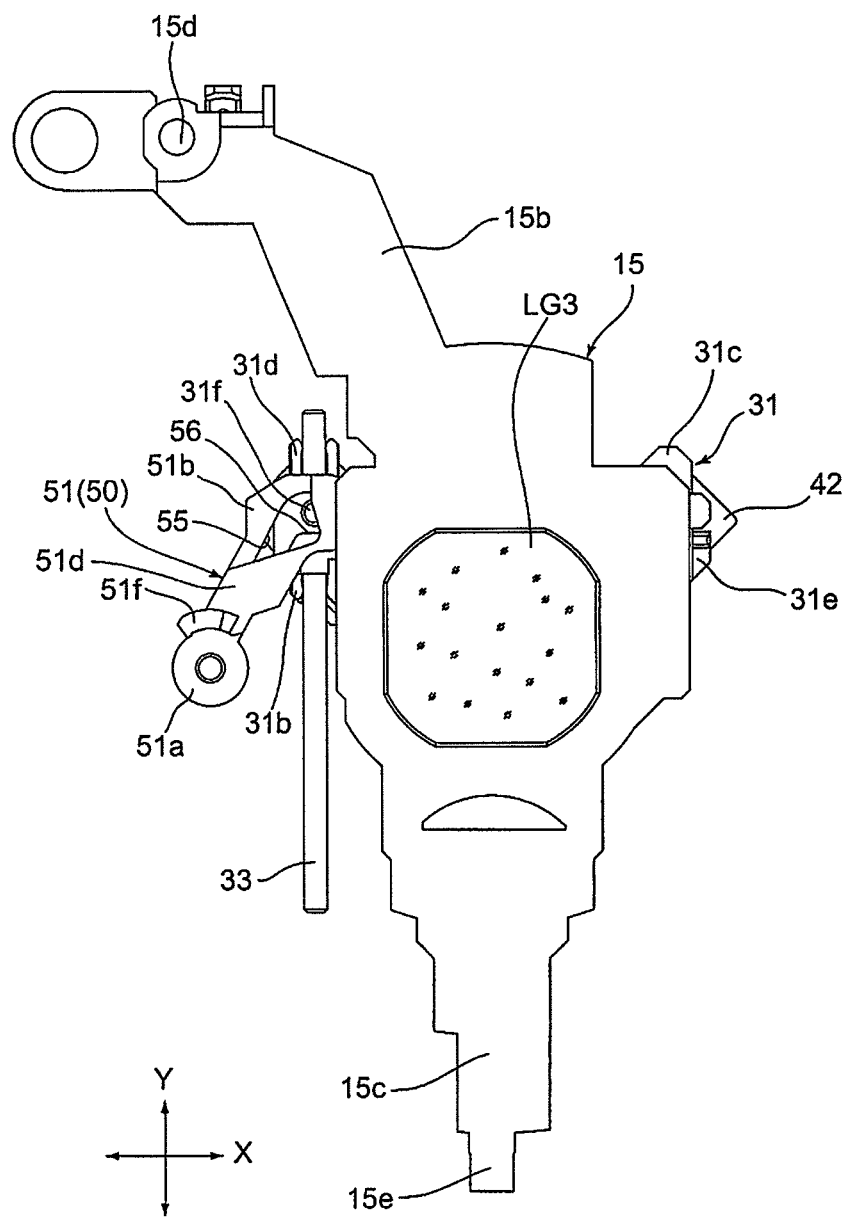
FIG. 13 is a rear elevational view of the second lens group support unit, the third lens group frame and the insertion/removal-operation control lever, respectively in transition from the ready-to-photograph state to the accommodated state, viewed from the rear in the optical axis direction.
Figure 17:
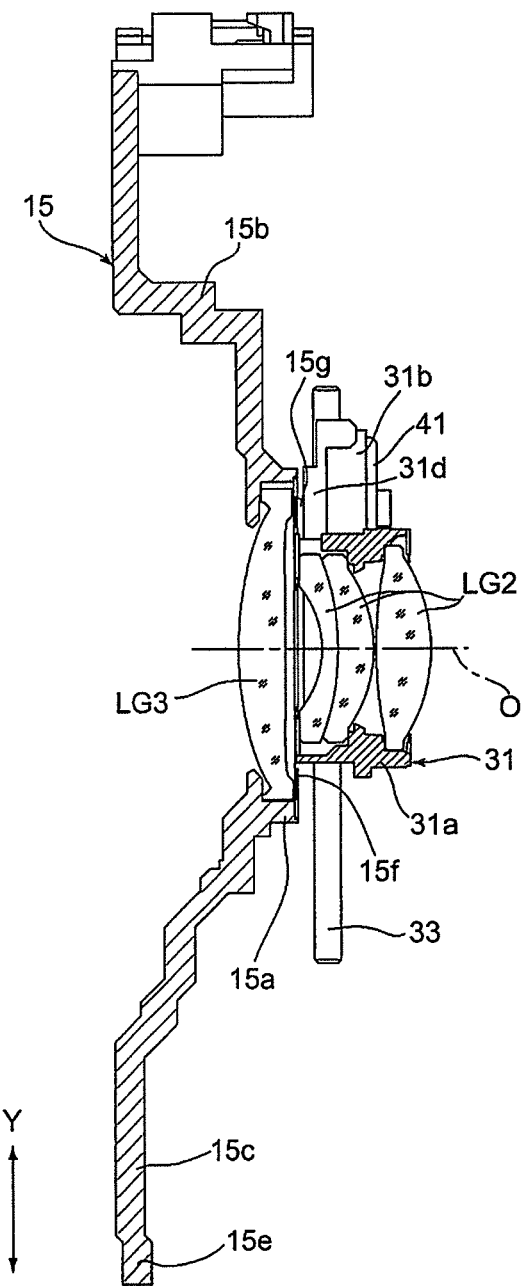
FIG. 17 is a cross sectional view along the Y-axis direction of the second lens group support unit, the third lens group frame and the insertion/removal-operation control lever, respectively in transition from the ready-to-photograph state to the accommodated state.
Figure 18:
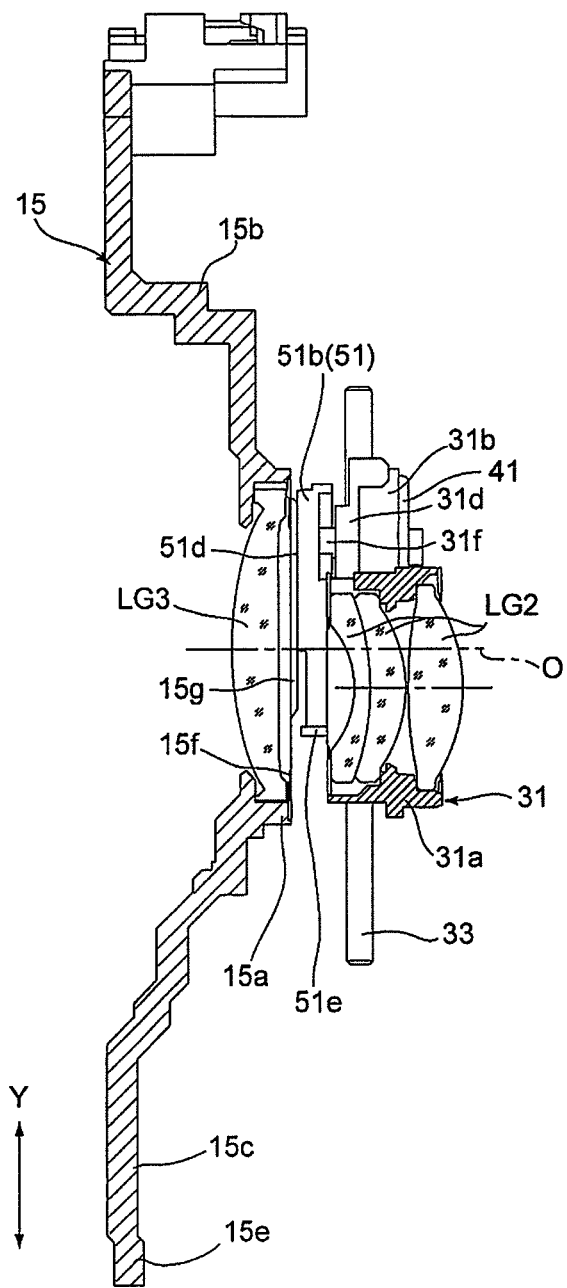
FIG. 18 is another cross sectional view along the Y-axis direction of the second lens group support unit, the third lens group frame and the insertion/removal-operation control lever, respectively in transition from the ready-to-photograph state to the accommodated state.

The maximum amount of movement of the second movable stage 31 in the Y-direction that is guided by the Y-guide shaft 33 is greater than the maximum driving amount of the second lens group LG2 in the Y-direction that is given to the second movable stage 31 by the electromagnetic actuator. When the second lens group LG2 (the second movable stage 31) is in the aforementioned anti-shake driving position, the upper ends of the support arms 31b and 31c of the second movable stage 31 are positioned in the close vicinity of the upper side portion 30a of the first movable stage 30. More specifically, in this state, a clearance is provided between the upper side portion 30a of the first movable stage 30 and the upper ends of the support arms 31b and 31c of the second movable stage 31, thus allowing the second movable stage 31 to move in either of the upward and downward directions in the Y-direction from that particular position by the electromagnetic actuator. With reference to FIGS. 9, 13 and 17, which show the transition process from the ready-to-photograph state to the accommodated state, the respective positions of the second movable stage 31 in the Y-direction is equivalent to the anti-shake driving position, although the positional relationship in the optical axis direction between the second movable stage 31 and the third lens group frame 15 is different from the ready-to-photograph state.

The second movable stage 31 can be moved downwardly, down to a position where the lower ends of the support arm portions 31b and 31c are positioned in the close vicinity of the lower side portion 30b of the first movable stage 30. When the second movable stage 31 is positioned at the lower movement limit thereof (see FIGS. 12, 16 and 20), neither the permanent magnet 41 nor the permanent magnet 42 faces the associated coil 43 or 44 in the optical axis direction, and the second lens group LG2 (the second movable stage 31) is positioned out of the anti-shake driving position, in which the position of the second lens group LG2 can be controlled by the electromagnetic actuator. This position of the second lens group LG2, in which the position of the second lens group LG2 cannot be controlled by the electromagnetic actuator is herein referred to as the off-axis position (removed position) of the second lens group LG2 (the second movable stage 31). When the second lens group LG2 (the second movable stage 31) is in the off-axis position, the second lens group LG2 is moved downward to a position to overlap (coincide with) the lower side portion 30b of the first movable stage 30 in the optical axis direction; however, in this state, the lower side portion 30b of the first movable stage 30 has been formed in a shape that avoids interference with the rear sides of the lens holder frame 31a. The second lens group movable ring 25 is provided with a radial through-hole 25c that allows part of the lens holder frame 31a that has been moved to the off-axis position. The second movable stage 31 that has reached the off-axis position is prevented from further moving downward by the engagement of the lower ends of the support arms 31b and 31c of the second movable stage 31 with the lower side portion 30b of the first movable stage 30.

Figure 6:
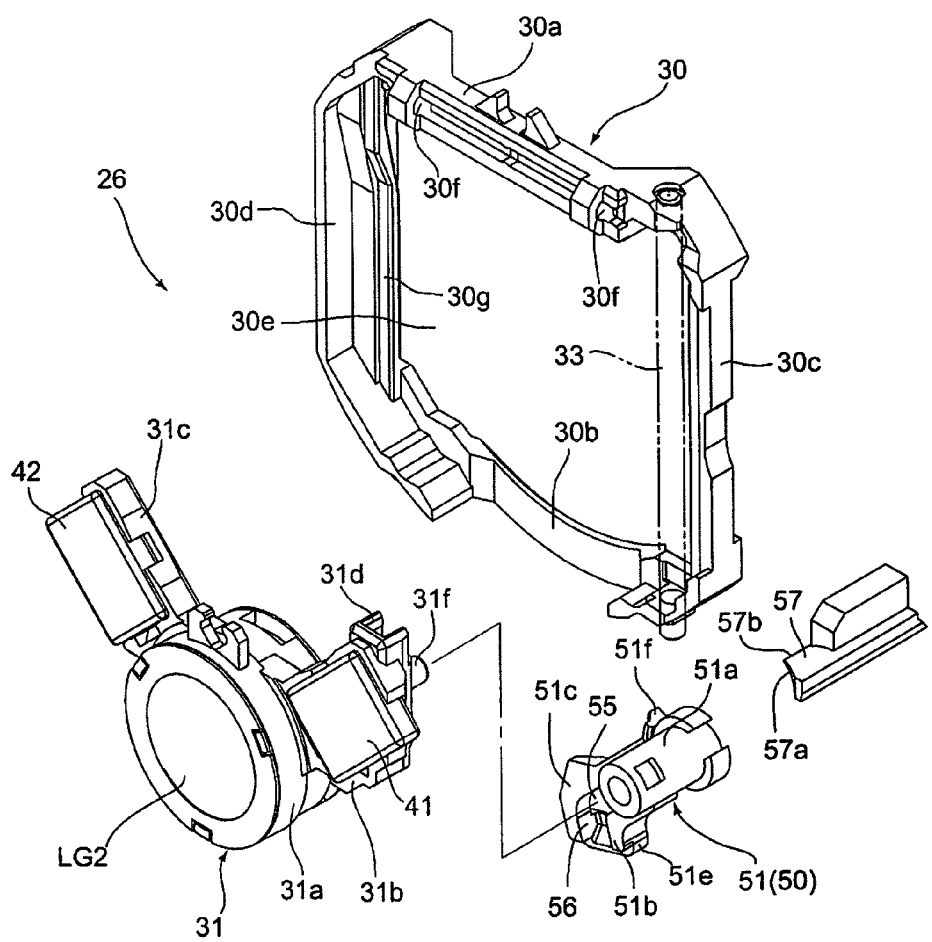
FIG. 6 is an exploded front perspective view of a second lens group support unit.
Figure 7:
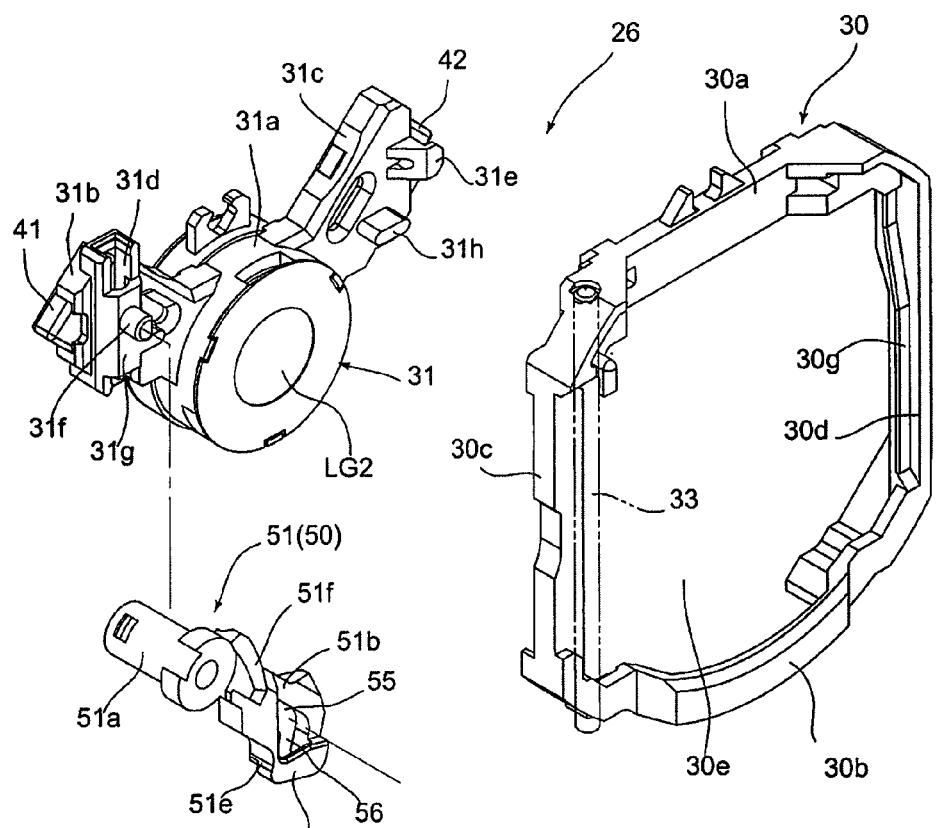
FIG. 7 is an exploded rear perspective view of the second lens group support unit.

The controllable range in which the position of the second lens group LG2 can be controlled by the electromagnetic actuator is limited to the anti-shake driving position, and the driving of the second lens group LG2 (the second movable stage 31) in the Y-direction when the second lens group LG2 is positioned in between the anti-shake driving position and the off-axis position (which deviates from the anti-shake driving position) is performed by an insertion/removal drive mechanism 50 provided separately from the electromagnetic actuator. As shown in FIGS. 4 through 7, the insertion/removal drive mechanism 50 is provided with an insertion/removal-operation control lever (removal driving member) 51 which is positioned inside the second lens group movable ring 25 and pivoted about a support shaft 52 that is fixed to the second lens group movable ring 25. As shown in FIGS. 6 and 7, a cylindrical bush 51a is formed at one end of the insertion/removal-operation control lever 51, and the support shaft 52 is inserted into a shaft hole of the bush 51a. The front end of the support shaft 52 is inserted into a shaft support hole (not shown) formed in the second lens group movable ring 25 to be supported thereby, and the rear end of the support shaft 52 is supported by a lever retaining member 53. In this supported state of the support shaft 52, the axis of the support shaft 52 is substantially parallel to the optical axis O, and the insertion/removal-operation control lever 51 is swingable about the support shaft 52. The lever retaining member 53 is fixed to the second lens group movable ring 25 and prevents the movement of the insertion/removal-operation control lever 51 in the axis direction of the support shaft 52 (the optical axis direction).

As shown in FIGS. 6 and 7, the insertion/removal-operation control lever 51 is provided with a control arm 51b, which is provided at the rear of the support arm 31b of the second movable stage 31, and extends in the radial direction from the bush 51a. The control arm 51b is provided with an insertion/removal-operation guide groove 55 and a displacement prevention groove 56, formed continuously therein. The insertion/removal-operation guide groove 55 extends in a radial direction with respect to the axis of the bush 51a. The displacement prevention groove 56 is bent relative to the insertion/removal-operation guide groove 55, and is formed greater in width than the insertion/removal-operation guide groove 55. The control arm 51b is provided with a front facing surface 51c and a rear slidable contact surface (rear flat surface) 51d, respectively formed on the front and the rear sides of the control arm 51b in the optical axis direction. The front facing surface 51c and the rear slidable contact surface 51d both lie on planes substantially orthogonal to the optical axis O, and are respectively positioned in a range so as not to overlap the insertion/removal-operation guide groove 55 or the displacement prevention groove 56. The control arm 51*b* is further provided with a guide projection (guide portion) 51*e* at the outer end thereof.

Figure 12:
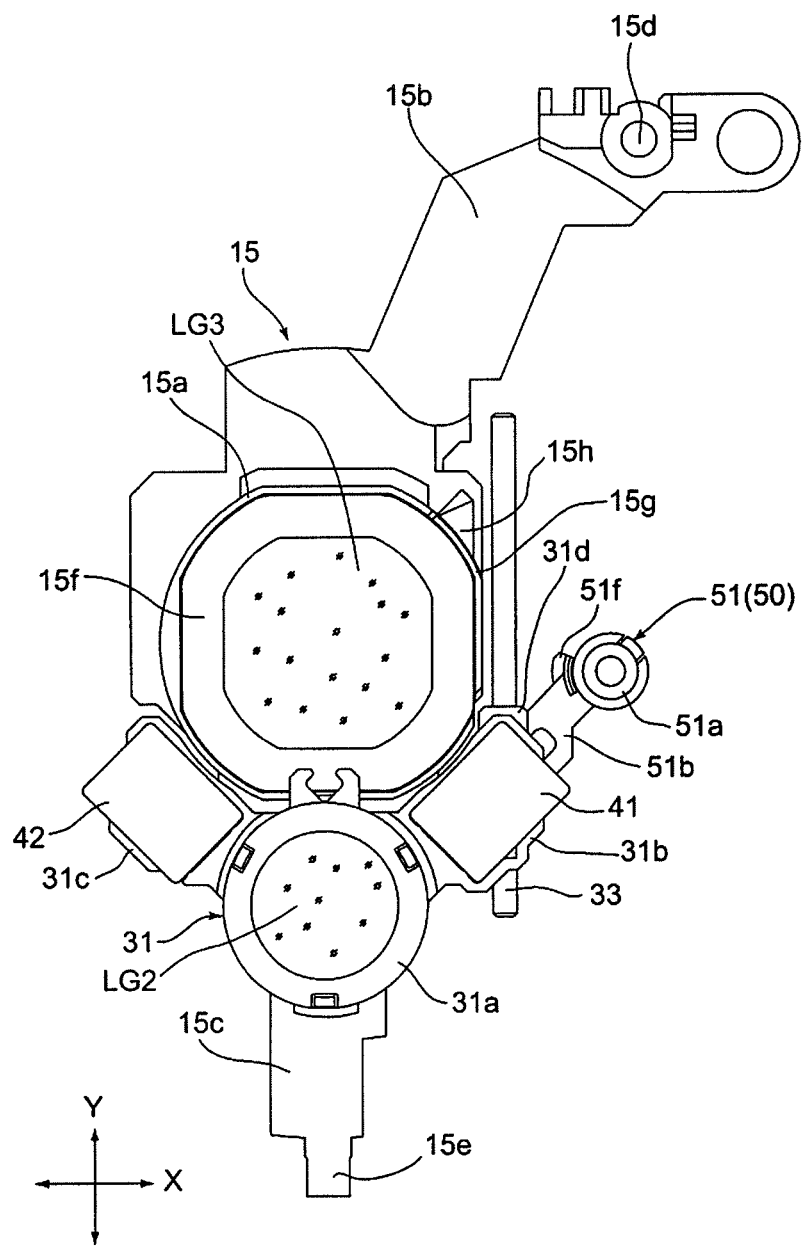
FIG. 12 is a front elevational view of the second lens group support unit, the third lens group frame and the insertion/removal-operation control lever in the accommodated state of the lens barrel, viewed from the front in the optical axis direction.
Figure 16:
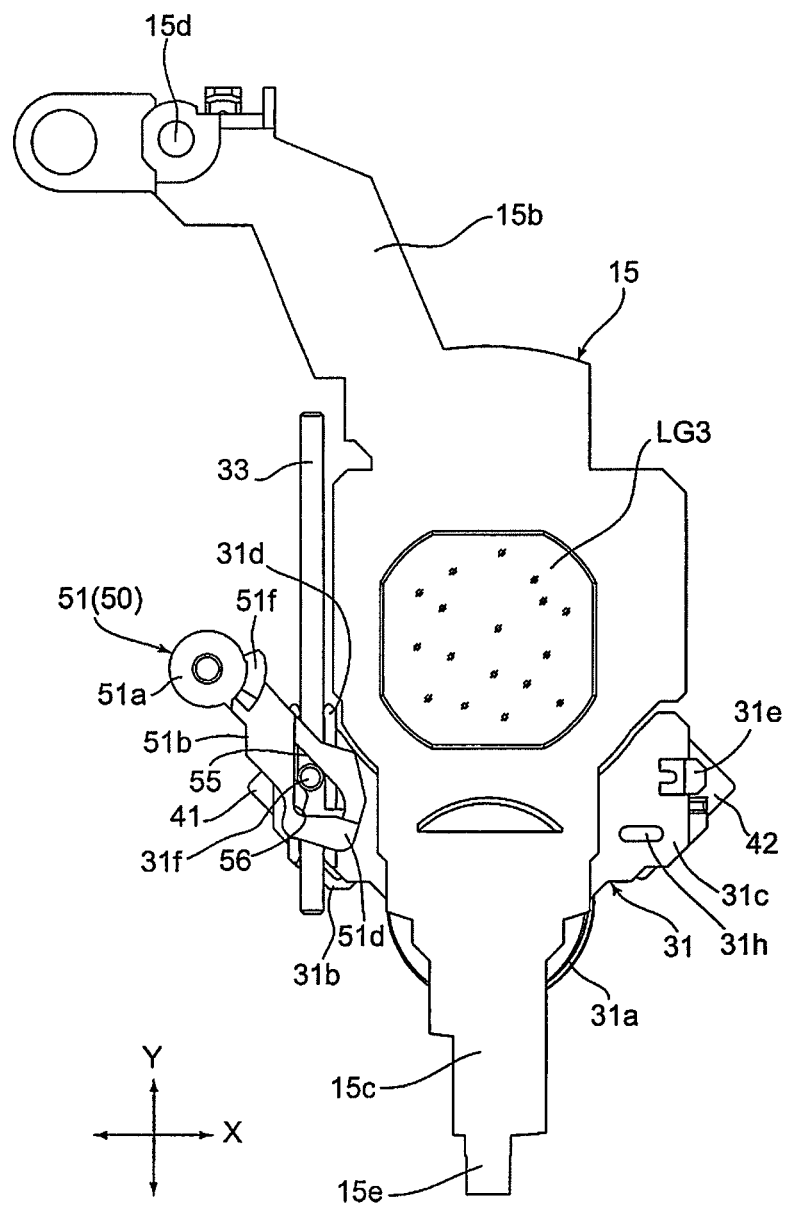
FIG. 16 is a rear elevational view of the second lens group support unit, the third lens group frame and the insertion/removal-operation control lever in the accommodated state of the lens barrel, viewed from the rear in the optical axis direction.

The second movable stage 31 is provided with a position control pin (projection) 31*f* which projects rearward from the Y-guide portion 31*d*. The position control pin 31*f* is positioned in the insertion/removal-operation guide groove 55 or the displacement prevention groove 56 in accordance with the swing position of the insertion/removal-operation control lever 51. As shown in FIGS. 12 and 16, when the second movable stage 31 is in the off-axis position, the insertion/removal-operation control lever 51 is held at a specific angular position (hereinafter referred to as "removed-lens holding position") at which the control arm 51*b* extends obliquely downwards from the rotational axis of the bush 51*a* while the position control pin 31*f* is engaged in the insertion/removal-operation guide groove 55. In this state, the position control of the second movable stage 31 in the Y-direction is carried out by the sliding engagement of the position control pin 31*f* with the facing surfaces of the insertion/removal-operation guide groove 55. A clockwise rotation of the insertion/removal-operation control lever 51 with respect to FIG. 12 from this state causes the inner surface of the insertion/removal-operation guide groove 55 to press the position control pin 31*f* upward, thus moving the second movable stage 31 toward the anti-shake driving position from the off-axis position.

When the second movable stage 31 is in the anti-shake driving position, the insertion/removal-operation control lever 51 is held at a specific angular position (hereinafter referred to as "lens-insertion position") at which the control arm 51*b* extends obliquely upwards from the rotational axis of the bush 51*a* while the position control pin 31*f* is engaged (positioned) in the displacement prevention groove 56, as shown in FIGS. 9 and 13. In this state, the direction of extension (lengthwise direction) of the displacement prevention groove 56 is substantially parallel to the X-direction and no position control for the position control pin 31*f* in the X-direction is carried out, and accordingly, the insertion/removal-operation control lever 51 does not interfere with movements of the first movable stage 30 and the second movable stage 31 in the X-direction driven by the electromagnetic actuator. In addition, the width of the displacement prevention groove 56 is formed greater than the width of the insertion/removal-operation guide groove 55, and the width-direction of the displacement prevention groove 56 corresponds to the Y-direction when the insertion/removal-operation control lever 51 is positioned at the lens-insertion position. Accordingly, a sufficient clearance is provided between the position control pin 31*f* and the inner wall surfaces of the displacement prevention groove 56 so as not to interfere with the movement of the second movable stage 31 in the Y-direction driven by the electromagnetic actuator when the insertion/removal-operation control lever 51 is positioned at the lens-insertion position.

Rotating the insertion/removal-operation control lever 51 from the lens-insertion position, with the second movable stage 31 (the second lens group LG2) in the anti-shake driving position, toward the removed-lens holding position causes inner surface of the insertion/removal-operation guide groove 55 to press the position control pin 31*f* downward to move the second movable stage 31 from the anti-shake driving position to the off-axis position.

In the second movable stage 31, the rear side surface of the Y-guide portion 31*d* from which the position control pin 31*f* projects, is formed as a facing flat surface 31*g*, as shown in FIG. 7. The facing flat surface 31*g* faces the front facing surface 51*c* formed on the control arm 51*b* of the insertion/removal-operation control lever 51. A slight clearance in the optical axis direction is secured between the facing flat surface 31*g* and the front facing surface 51*c* when the position control pin 31*f* is inserted into the insertion/removal-operation guide groove 55 and the displacement prevention groove 56, as shown in FIGS. 21 through 24. The position control pin 31*f* and the insertion/removal-operation guide groove 55 transmit a moving force orthogonal to the optical axis direction rather than a moving force in the optical axis direction, and since there is a clearance between the facing flat surface 31*g* and the front facing surface 51*c*, the insertion/removal-operation control lever 51 does not apply any load on the second movable stage 31 in the optical axis direction. The second movable stage 31 is further provided with a support projection 31*h* projecting from the rear surface of the support arm 31*c*. The rear end surface of the support projection 31*h* is positioned further rearward than the rear end surface of the lens holder frame 31*a* in the optical axis direction.

The insertion/removal-operation control lever 51 is biased to rotate toward the lens-insertion position by a lever biasing spring 54, as shown in FIGS. 4 and 5. The lever biasing spring 54 is a torsion coil spring having the coil part thereof supported on the outer peripheral surface of the bush 51*a*. The coil part has a pair of spring end portions extending therefrom, one of which is hooked onto the insertion/removal-operation control lever 51 and the other of which is hooked onto the second lens group movable ring 25. The second lens group movable ring 25 is provided on an inner peripheral surface thereof with a stopper (not shown), with which the insertion/removal-operation control lever 51 comes in contact by the biasing force of the lever biasing spring 54. Accordingly, in a state where no extra external force is exerted on the insertion/removal-operation control lever 51, the insertion/removal-operation control lever 51 is held at the lens-insertion position, so that the second movable stage 31 is held in the anti-shake driving position.

The image sensor holder 14 is provided with a removing-operation control projection 57 (see FIGS. 4 and 6) which projects forward in the optical axis direction. Rearward movement of the second lens group movable ring 25 toward the image sensor holder 14 in the optical axis direction causes the removing-operation control projection 57 to press the insertion/removal-operation control lever 51 to thereby rotate the insertion/removal-operation control lever 51 toward the removed-lens holding position from the lens-insertion position against the biasing force of the lever biasing spring 54. More specifically, the removing-operation control projection 57 is provided at the front end thereof with an end-face cam 57*a*, and retracting movement of the second lens group movable ring 25 toward the removing-operation control projection 57 causes a cam-contacting portion 51*f* that is formed on the insertion/removal-operation control lever 51 to come in contact with the end-face cam 57*a* (see FIGS. 6 and 7). Thereafter, a further retracting movement of the second lens group movable ring 25 with the cam-contacting portion 51*f* in contact with the end-face cam 57*a* causes a component force which rotates the insertion/removal-operation control lever 51 toward the removed-lens holding position. Upon the insertion/removal-operation control lever 51 reaching the removed-lens holding position, a removed-lens holding surface 57*b*, which is formed on a side of the removing-operation control projection 57 extending substantially parallel to the optical axis O, is engaged with the side surface of the cam-contacting portion 51f so that the insertion/removal-operation control lever 51 continues to be held at the removed-lens holding position.

Operations of the zoom lens barrel 10 that has the above described structure will be discussed hereinafter. In the accommodated state of the zoom lens barrel 10 shown in FIG. 1, the zoom motor 62 is actuated to rotate in a lens barrel advancing direction to thereby rotate the aforementioned zoom gear (not shown) upon a main switch of an imaging device, to which the zoom lens barrel 10 is mounted, being turned ON. The rotation of the zoom gear causes the first advancing barrel 16 to move forward while rotating by being guided via the guide groove 13b of the housing 13. The first linear guide ring 20 linearly moves forward with the first advancing barrel 16. The second lens group movable ring 25 (the second lens-group unit 17) is linearly guided by the linear guide groove 20 inside the first advancing barrel 16, and the rotation of the first advancing barrel 16 causes the second lens group movable ring 25 (the second lens-group unit 17) to move in a predetermined moving manner in the optical axis direction in accordance with the engagement relationship between the second lens group control cam grooves CG2 and the second lens group cam followers CF2. The second advancing barrel 18 is linearly guided by the linear guide ring 20, and the rotation of the first advancing barrel 16 also causes the second advancing barrel 18 to move in a predetermined manner in the optical axis direction in accordance with the engagement relationship between the first lens group control cam grooves CG1 and the first lens group cam followers CF1.

Namely, the amount of advancement of the first lens group LG1 from the accommodated state of the zoom lens barrel 10 is determined by the sum of the amount of forward movement of the first advancing barrel 16 relative to the housing 13 and the amount of forward movement of the second advancing barrel 18 relative to the first advancing barrel 16. The amount of advancement of the second lens group LG2 from the accommodated state of the zoom lens barrel 10 is determined by the sum of the amount of forward movement of the first advancing barrel 16 relative to the housing 13 and the amount of forward movement of the second lens group movable ring 25 relative to the first advancing barrel 16. A zooming operation is carried out by moving the first lens group LG1 and the second lens group LG2 along the optical axis O while changing the air distance therebetween. When the zoom lens barrel 10 is driven to advance from the accommodated state shown in FIG. 1, the zoom lens barrel 10 firstly moves into a lens barrel advanced state shown in FIG. 2, in which the zoom lens barrel 10 is at the wide-angle extremity. Subsequently, the zoom lens barrel 10 moves into a lens barrel advanced state shown in FIG. 3, in which the zoom lens barrel 10 is at the telephoto extremity, by a further rotation of the zoom motor 62 in a lens barrel advancing direction thereof. Upon the main switch being turned OFF, the zoom motor 62 is driven to rotate in the lens barrel retracting direction, so that the zoom lens barrel 10 operates in the reverse manner to the above described lens barrel advancing operation to thereby return to the accommodated state shown in FIG. 1.

When the zoom lens barrel 10 is in the zoom range between the wide-angle extremity and the telephoto extremity, the third lens group frame 15 that supports the third lens group LG3 moves along the optical axis O to perform a focusing operation by driving the AF motor 61 in accordance with object distance information obtained via a distance measuring device (not shown). The moving range (photographing position) of the third lens group frame 15 within this zoom range for carrying out focusing is in front of (located forward from) the retracted accommodating position shown in FIG. 1.

The overall operation of the zoom lens barrel 10 has been discussed above. Operations of the retracting structure of the zoom lens barrel 10 which are related to the operations of the second lens group support unit 26 and the operation of the second lens group support unit 26 in a ready-to-photograph state will be discussed hereinafter.

In the accommodated state of the zoom lens barrel 10 shown in FIG. 1, the third lens group frame 15 has been retracted to the retracted accommodating position (the rear movement limit) thereof in the close vicinity of the front of the image sensor holder 14, and also the second lens group movable ring 25 has been retracted to the retracted accommodating position (the rear movement limit) thereof. The insertion/removal-operation control lever 51 is biased to rotate to the lens-insertion position by the lever biasing spring 54; however, in a state where the second lens group movable ring 25 is positioned at the retracted accommodating position thereof, the insertion/removal-operation control lever 51 is prevented from rotating in the biasing direction of the lever biasing spring 54 by the engagement of the removed-lens holding surface 57b of the removing-operation control projection 57 with the side surface of the cam-contacting portion 51f, to be held in the removed-lens holding position (see FIGS. 12 and 16). When the insertion/removal-operation control lever 51 is in the removed-lens holding position, the inner surface of the insertion/removal-operation guide groove 55 restricts the upward movement of the position control pin 31f, so that the second movable stage 31 that holds the second lens group LG2 is held in the off-axis position that is eccentric and downward from the optical axis O. At this instance, the lens holder frame 31a of the second movable stage 31 enters the radial through-hole 25c of the second lens group movable ring 25 to allow an increased amount of removal movement of the second movable stage 31 without being interfered by the second lens group movable ring 25.

Figure 20:
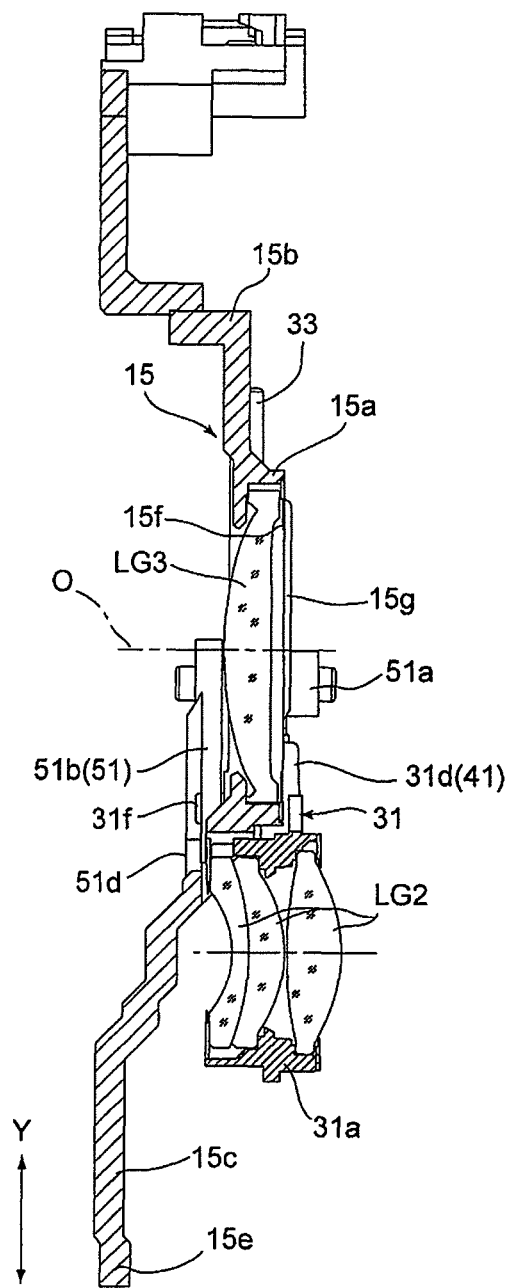
FIG. 20 is a cross sectional view along the Y-axis direction of the second lens group support unit, the third lens group frame and the insertion/removal-operation control in the accommodated state of the lens barrel.
Figure 24:
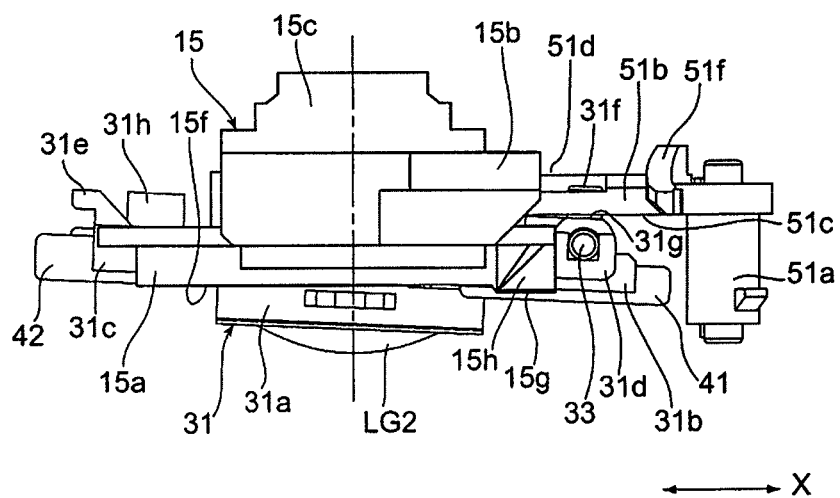
FIG. 24 is a plan view of the second lens group support unit, the third lens group frame and the insertion/removal-operation control lever in the accommodated state of the lens barrel.

The off-axis positioning of the second movable stage 31 allows an increase in the open area of the stage opening 30e of the first movable stage 30, and therefore the stage opening 30e has an empty space therein, in the vicinity of the optical axis O, that is free from existence of the second movable stage 31. The lens holding frame 15a of the third lens group frame 15 enters into the open area of the stage opening 30e (i.e., the area in which the second lens group LG2, the second movable stage 31, the permanent magnets 41 and 42, etc., are positioned in the ready-to-photograph state), hence, the second lens group LG2 and the third lens group LG3 are aligned in Y-direction, as shown in FIGS. 1, 12 and 20. Accordingly, when the zoom lens barrel 10 is in the accommodated state, the thickness (length) of the imaging optical system in the optical axis direction becomes smaller, whereby downsizing (miniaturization) of the overall length of the lens barrel in the accommodated state can be accomplished. As shown in FIG. 24, when the second movable stage 31 moves to the off-axis position from the anti-shake driving position, the angle of the second movable stage 31 slightly varies about the Y-guide shaft 33. Although this variation in angle is due to the shape of the guide rib 30g that guides the guide member 30e, the present invention may also have another structure in which the second movable stage 31 moves in the Y-direction without causing such a variation in angle.

Upon the zoom lens barrel 10 being advanced from the accommodated position shown in FIG. 1 by an operation of the zoom motor 62 to thereby move the second lens group movable ring 25 forward in the optical axis direction, the insertion/removal-operation control lever 51 is disengaged from the removing-operation control projection 57 to thereby cancel the rotation restriction by the removed-lens holding surface 57b, which causes the insertion/removal-operation control lever 51 to rotate from the removed-lens holding position (see FIGS. 12 and 16) toward the lens-insertion position (see FIGS. 9 and 13) by the biasing force of the lever biasing spring 54. Thereupon, the inner surface of the insertion/removal-operation guide groove 55 presses the position control pin 31f upward to move the second movable stage 31 toward the anti-shake driving position in the Y-direction. At this stage, the second lens group support unit 26 has been moved further forward than the third lens group frame 15 and the lens holding frame 15a of the third lens group frame 15 has been moved out of the stage opening 30e of the first movable stage 30, and accordingly, the second movable stage 31 which moves toward the anti-shake driving position does not interfere with the third lens group frame 15. When the second movable stage 31 is moved upward by certain degree via the insertion/removal-operation control lever 51, the permanent magnets 41 and 42 face the coils 43 and 44, respectively, and the second lens group support unit 26 moves into a state where the positions of the first movable stage 30 and the second movable stage 31 can be controlled by the electromagnetic actuator, i.e., the second movable stage 31 (the second lens group LG2) reaches the anti-shake driving position. As noted above, when the second movable stage 31 is in the anti-shake driving position, the position control pin 31f is positioned in the displacement prevention groove 56 of the insertion/removal-operation control lever 51, and the second movable stage 31 is allowed to move in the X-direction and the Y-direction by a predetermined amount relative to the insertion/removal-operation lever 51.

The movement of the second movable stage 31 to the anti-shake driving position via the insertion/removal-operation control lever 51 is completed before the zoom lens barrel 10 reaches the wide-angle extremity position thereof shown in FIG. 2. When the second movable stage 31 is in the anti-shake driving position, the insertion/removal-operation control lever 51 is disengaged forwardly from the removing-operation control projection 57, and the cam-contacting portion 51f and the end-face cam 57a are spaced away from each other in the optical axis direction while facing each other in the optical axis direction. Thereafter, until the lens barrel retracting operation is again performed, the insertion/removal-operation control lever 51 and the removing-operation control projection 57 do no come in contact with each other, so that the second movable stage 31 remains held in the anti-shake driving position. Although the position of the second lens group movable ring 25 in the optical axis direction varies in accordance with the rotation of the first advancing barrel 16 within the zoom range from the wide-angle extremity to the telephoto extremity, the insertion/removal-operation control lever 51 does not come in contact with the removing-operation control projection 57 since the position of the second lens group movable ring 25 in the vicinity of the wide-angle extremity position shown in FIG. 2 corresponds to the rear movement limit of the second lens group movable ring 25 in the photographing position (in the ready-to-photograph state). Accordingly, the second movable stage 31 is held in the anti-shake driving position over the entire zoom range.

In the zoom range, displacements (image shake) of an object image focused on the light receiving surface of the image sensor 12 can be reduced by driving the first movable stage 30 and the second movable stage 31 in the X-direction and the Y-direction by the electromagnetic actuator in accordance with the direction and magnitude of vibrations applied to the zoom lens barrel 10. More specifically, the angular velocity about the X-axis and the angular velocity about the Y-axis are detected by the X-gyro sensor 64 and the Y-gyro sensor 65, respectively, and these angular velocities are time-integrated to obtain a moving angle, and subsequently, the moving amounts of the image on a focal plane (the light receiving surface of the image sensor 12) in the X-direction and in the Y-direction are calculated based on the obtained moving angle while the driving amounts and the driving directions of the second lens group LG2 for the respective X and Y axial directions are calculated in order to cancel out the image shake. Thereupon, the passage of current through each of the coils 43 and 44 is controlled in accordance with the calculated values.

In the lens barrel retracting operation performed from a state where the zoom lens barrel 10 is in the zoom range, the zoom lens barrel 10 operates in the reverse manner to the above described lens barrel advancing operation. Specifically, a rotation of the zoom motor 62 in the lens barrel retracting direction causes the second lens group movable ring 25 to move rearward in the optical axis direction, and this rearward movement of the second lens group movable ring 25 causes the cam-contacting portion 51f of the insertion/removal-operation control lever 51 which moves rearward with the second lens group movable ring 25 to come in contact with the end-face cam 57a of the removing-operation control projection 57. Further rearward movement of the second lens group movable ring 25 causes the cam-contacting portion 51f to be pressed by the end-face cam 57a. Thereupon, a component force is produced from the retracting force of the second lens group movable ring 25, so that the insertion/removal-operation control lever 51 is rotated toward the removed-lens holding position from the lens-insertion position against the biasing force of the lever biasing spring 54. Thereupon, the position control pin 31f moves into the insertion/removal-operation guide groove 55 from the displacement prevention groove 56, and the inner surface of the insertion/removal-operation guide groove 55 presses the position control pin 31f downward so that the second movable stage 31 moves from the anti-shake driving position toward the off-axis position. Further rearward movement of the second lens group movable ring 25 causes the side surface of the cam-contacting portion 51f of the insertion/removal-operation control lever 51 to come in contact with the removed-lens holding surface 57b of the removing-operation control projection 57, so that the insertion/removal-operation control lever 51 is held in the removed-lens holding position and prevented from rotating toward the lens-insertion position. Namely, the second movable stage 31 is held in the off-axis position.

The movement of the second movable stage 31 from the anti-shake driving position to the off-axis position via the insertion/removal-operation control lever 51 is completed before the second lens group movable ring 25 reaches the retracted accommodating position thereof shown in FIG. 1. Subsequently, further rearward movement of the second lens group movable ring 25 after completion of the displacement of the second movable stage 31 causes the lens holding frame 15a of the third lens group frame 15 to enter into the stage opening 30e of the first movable stage 30, the open area of which has been increased, thus moving the zoom lens barrel 10 to the aforementioned accommodated state (shown in FIG. 1).

The aforementioned lens barrel retracting operation is categorized in two modes (mode 1 and mode 2) depending on the state of the third lens group frame 15 (the position in the optical axis direction). In mode 1, the third lens group frame 15 moves to the retracted accommodating position as shown in FIG. 1 by the driving of the AF motor 61 before the retracting operation of a variable magnification lens-group unit including the first lens group LG1 and the second lens group LG2. In mode 1, the aforementioned lens barrel retracting operation including the movement of the second movable stage 31 to the off-axis position is carried out while causing no interference of the third lens group frame 15 with any structural element of the variable magnification lens-group unit. In mode 2, the retracting operation of the variable magnification lens-group unit is carried out without moving the third lens group frame 15 by the AF motor 61 to the retracted accommodating position shown in FIG. 1. Mode 2 will be discussed in detail hereinafter.

Figure 21:
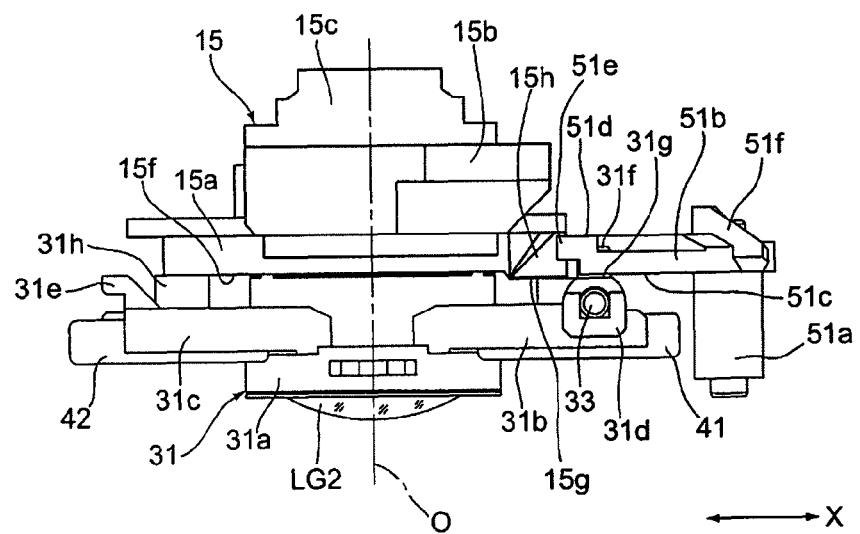
FIG. 21 is a plan view of the second lens group support unit, the third lens group frame and the insertion/removal-operation control lever, respectively in transition from the ready-to-photograph state to the accommodated state.

When the second lens group movable ring 25 moves rearward in the optical axis direction from the photographing position (ready-to-photograph state) by the driving of the zoom motor 62 in the retracting direction, the second movable stage 31 that is supported in the second lens group movable ring 25 moves closer to the third lens group frame 15. At this stage, the position of the second movable stage 31 in the Y-direction is in the anti-shake driving position as shown in FIGS. 9 and 13. The insertion/removal-operation control lever 51 is held at the lens-insertion position corresponding to the aforementioned anti-shake driving position, i.e., the insertion/removal-operation control lever 51 is at a position that does not coincide with the lens retaining frame 15f or the contact flange 15g of the third lens group frame 15, as viewed in the optical axis direction. Therefore, when the second lens group movable ring 25 moves rearward, the rear end portion of the support projection 31h of the second movable stage 31 comes in contact with the front surface of the lens retaining frame 15f of the third lens group frame 15, while the insertion/removal-operation lever 51 does not prevent the second movable stage 31 and the third lens group frame 15 from closely approaching each other. The facing flat surface 31g of the second movable stage 31 also comes in contact with the contact flange 15g of the third lens group frame 15. Thereupon, the guide projection 51e in the vicinity of the outer end of the control arm 51b of the insertion/removal-operation control lever 51, which is held at the lens-insertion position, enters the guide recess 15h of the third lens group frame 15 as shown in FIG. 21. In this state, when the second lens group movable ring 25 moves rearward, the third lens group frame 15 is pressed rearward via the contacting portions with the second movable stage 31 (i.e., the facing flat surface 31g and the support projection 31h contacting the contact flange 15g and the lens retaining frame 15f, respectively). The third lens group frame 15 is biased to move forward by the third lens group biaser spring 81, whereby a portion at the outer end of the guide arm 15b comes in contact with the AF nut 82, and the rearward movement of the third lens group frame 15 can be carried out without being restricted by the AF nut 82. Therefore, the third lens group frame 15 in a state of being pressed in response to the retracting movement of the second lens group movable ring 25 moves rearward in the optical axis direction together with the second lens group movable ring 25 against the biasing force of the third lens group biaser spring 81.

Figure 10:
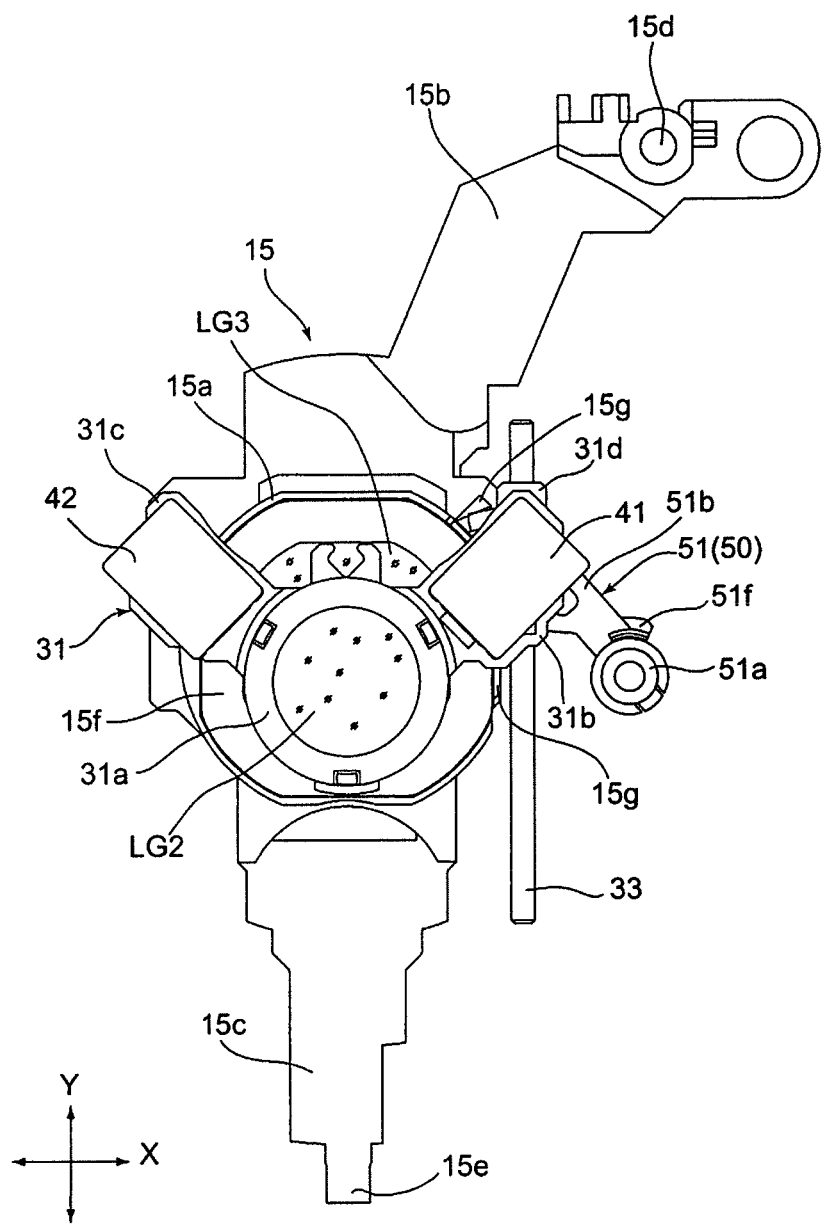
FIG. 10 is another front elevational view of the second lens group support unit, the third lens group frame and the insertion/removal-operation control lever, respectively in transition from the ready-to-photograph state to the accommodated state, viewed from the front in the optical axis direction.
Figure 14:
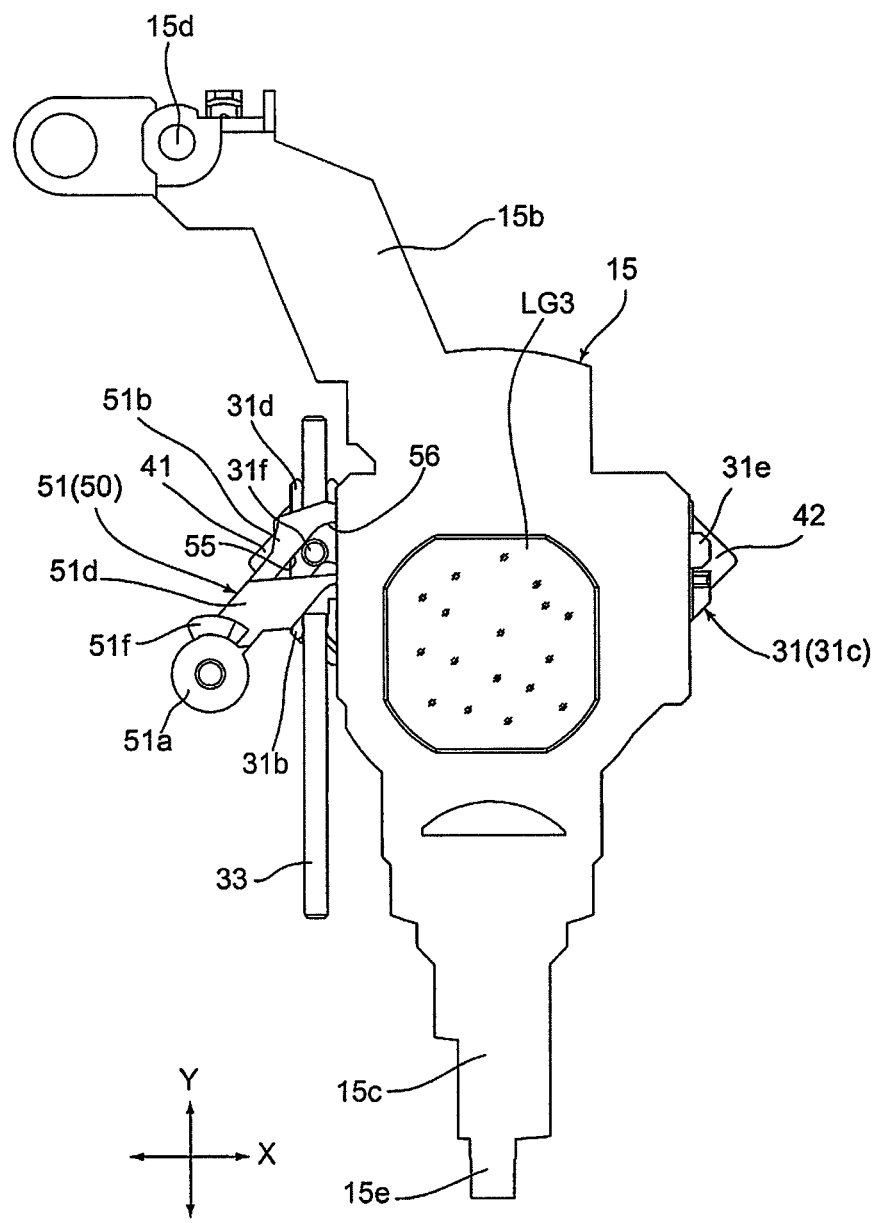
FIG. 14 is another rear elevational view of the second lens group support unit, the third lens group frame and the insertion/removal-operation control lever, respectively in transition from the ready-to-photograph state to the accommodated state, viewed from the rear in the optical axis direction.
Figure 22:
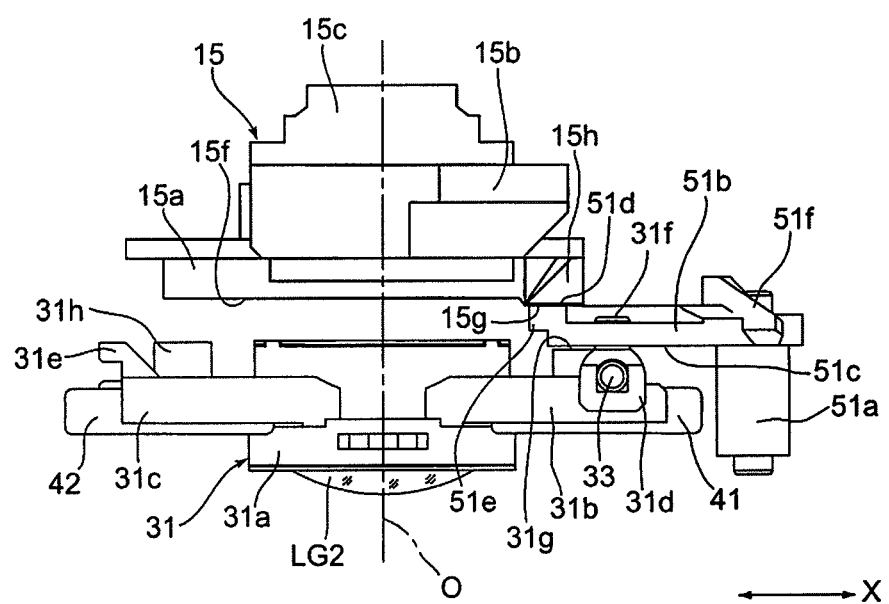
FIG. 22 is another plan view of the second lens group support unit, the third lens group frame and the insertion/removal-operation control lever, respectively in transition from the ready-to-photograph state to the accommodated state.

As discussed above, when the second lens group movable ring 25 moves closer to the image sensor holder 14 during the retracting operation, the insertion/removal-operation control lever 51 is pressed by the removing-operation control projection 57 so that the insertion/removal-operation control lever 51 is rotated from the lens-insertion position to the removed-lens holding position. Thereupon, the guide projection 51e of the control arm 51b of the insertion/removal-operation control lever 51 presses the inner surface of the guide recess 15h of the third lens group frame 15. The inner surface of the guide recess 15h has been formed as a tapered surface in order to produce a component force of pressing the third lens group frame 15 in the rearward direction in response to the rotation of the insertion/removal-operation control lever 51 to the removed-lens holding position, and thus the third lens group frame 15 is pressed rearward relative to the second movable stage 31 as shown in FIG. 22. The position of the second movable stage 31 in the Y-direction in the aforementioned state is shown in FIGS. 10 and 14. The pressing of the third lens group frame 15 in the rearward direction causes the control arm 51b of the insertion/removal-operation control lever 51 to enter the space between the rear surface of the second movable stage 31 and the front surface of the lens holding frame 15a of the third lens group frame 15, whereby the rear slidable contact surface 51d of the insertion/removal-operation control lever 51 comes in contact with the contact flange 15g of the third lens group frame 15. Since the contact flange 15g is formed along a moving (rotating) path of the insertion/removal-operation control lever 51, the insertion/removal-operation control lever 51 rotates toward the removed-lens holding position by maintaining the sliding contact of the rear slidable contact surface 51d with the contact flange 15g. The second lens group movable ring 25 continues moving rearwardly during the rotation of the insertion/removal-operation control lever 51 while the second movable stage 31 and the third lens group frame 15 move in the rearward direction while maintaining a space (distance) therebetween in the optical axis direction as shown in FIG. 22.

Figure 11:
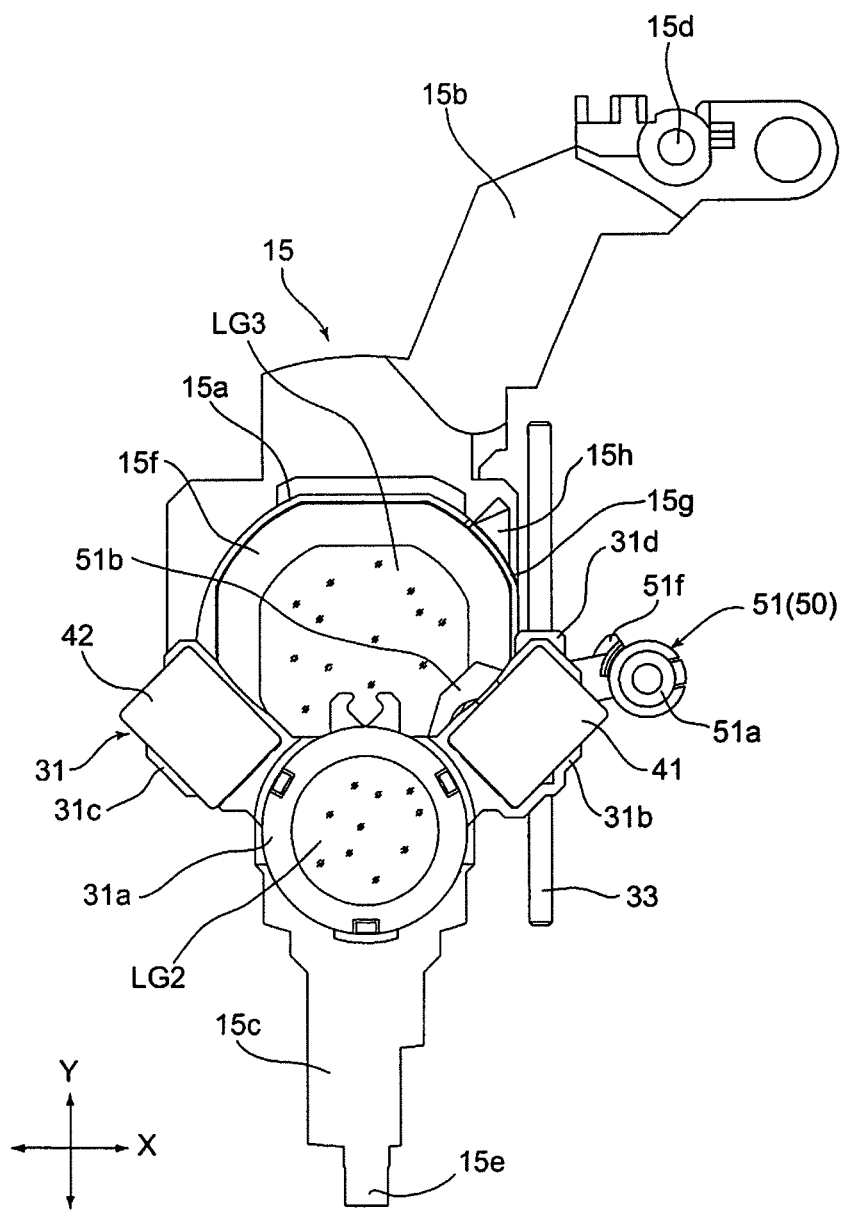
FIG. 11 is another front elevational view of the second lens group support unit, the third lens group frame and the insertion/removal-operation control lever, respectively in transition from the ready-to-photograph state to the accommodated state, viewed from the front in the optical axis direction.
Figure 15:
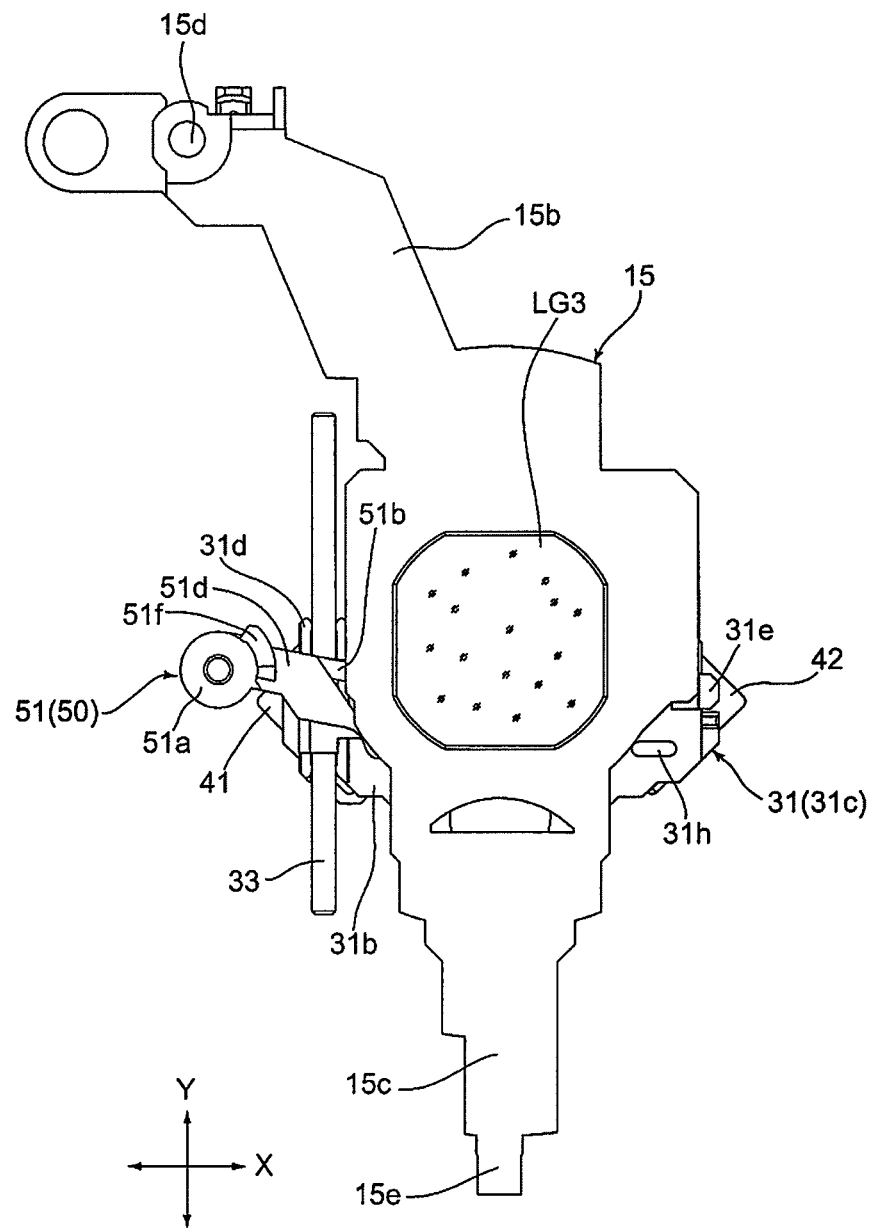
FIG. 15 is another rear elevational view of the second lens group support unit, the third lens group frame and the insertion/removal-operation control lever, respectively in transition from the ready-to-photograph state to the accommodated state, viewed from the rear in the optical axis direction.
Figure 19:
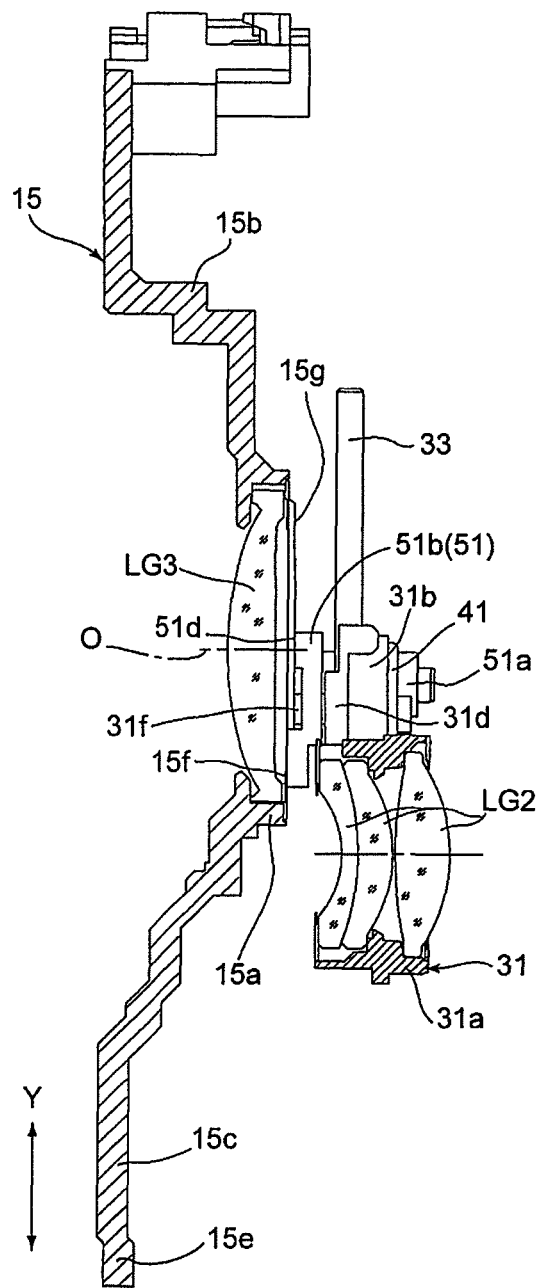
FIG. 19 is another cross sectional view along the Y-axis direction of the second lens group support unit, the third lens lever, respectively in transition from the ready-to-photograph state to the accommodated state.
Figure 23:
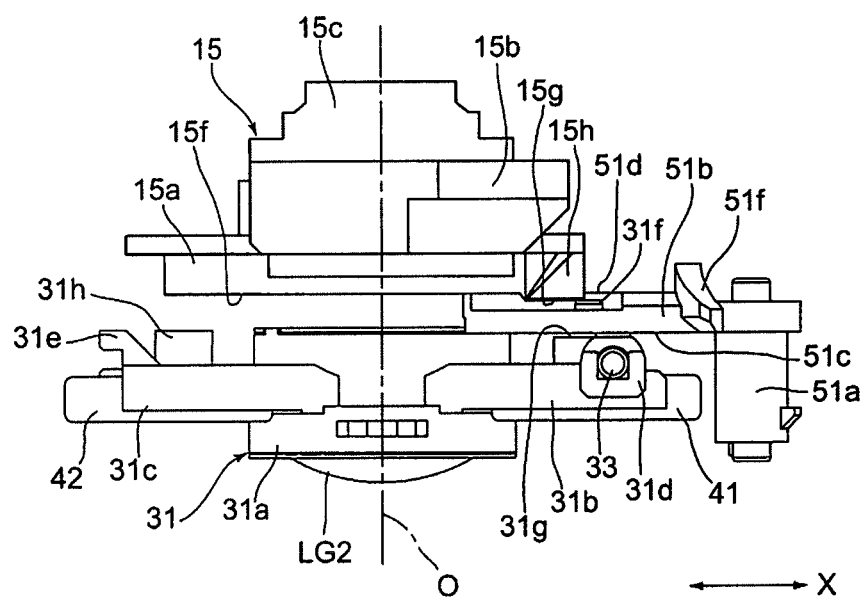
FIG. 23 is another plan view of the second lens group support unit, the third lens group frame and the insertion/removal-operation control lever, respectively in transition from the ready-to-photograph state to the accommodated state.

When the second movable stage 31 moves toward the off-axis position and reaches the position shown in FIGS. 11, 15 and 19, the rear slidable contact surface 51d of the insertion/removal-operation control lever 51 deviates from the position of facing the contact flange 15g of the third lens group frame 15. In this state, as shown in FIG. 23, the control arm 51b of the insertion/removal-operation control lever 51 is still inserted in the front portion of the lens holding frame 15a of the third lens group frame 15; however, when the second movable stage 31 eventually reaches the off-axis position as shown in FIGS. 12 and 16, the control arm 51b of the insertion/removal-operation control lever 51 is positioned completely away from the position of facing the lens holding frame 15a of the third lens group frame 15. Accordingly, the insertion/removal-operation control lever 51 no longer prevents the second movable stage 31 and the third lens group frame 15 from moving closer to each other, and as shown in FIGS. 20 and 24, in response to the further retracting movement of the second lens group movable ring 25, the second movable stage 31 moves rearward until reaching the position where the second lens group LG2 and the third lens group LG3 are aligned in the Y-direction (i.e., overlap in the optical axis direction).

According to the retracting operation in mode 2 as discussed above, the third lens group frame 15 moves rearward by utilizing the movement force of the second lens group movable ring 25 instead of the driving force of the AF motor 61, and this operation in mode 2 can be selected as a normal retracting operation mode. The retracting operation in mode 2 can also be utilized as a fail-safe mode in the instance where the retracting operation in mode 1 cannot be carried out by using the AF motor 61 due to some reason. While the second movable stage 31 moves from the anti-shake driving position to the off-axis position, the retracting operation in mode 2 prevents interference between the second lens group LG2 and the third lens group LG3 by the third lens group frame 15 coming into contact with the insertion/removal-operation control lever 51, which is used for removing the second movable stage 31, rather than the third lens group frame 15 coming into contact with the second movable stage 31 itself.

Therefore, when the second movable stage 31 is removed to the off-axis position, since there is no load on the second movable stage 31 in the optical axis direction produced by contacting with the third lens group frame 15, the load on the support mechanism of the second movable stage 31 becomes smaller, and the removal of the second movable stage 31 can be carried out in a smooth manner.

Figure 26:
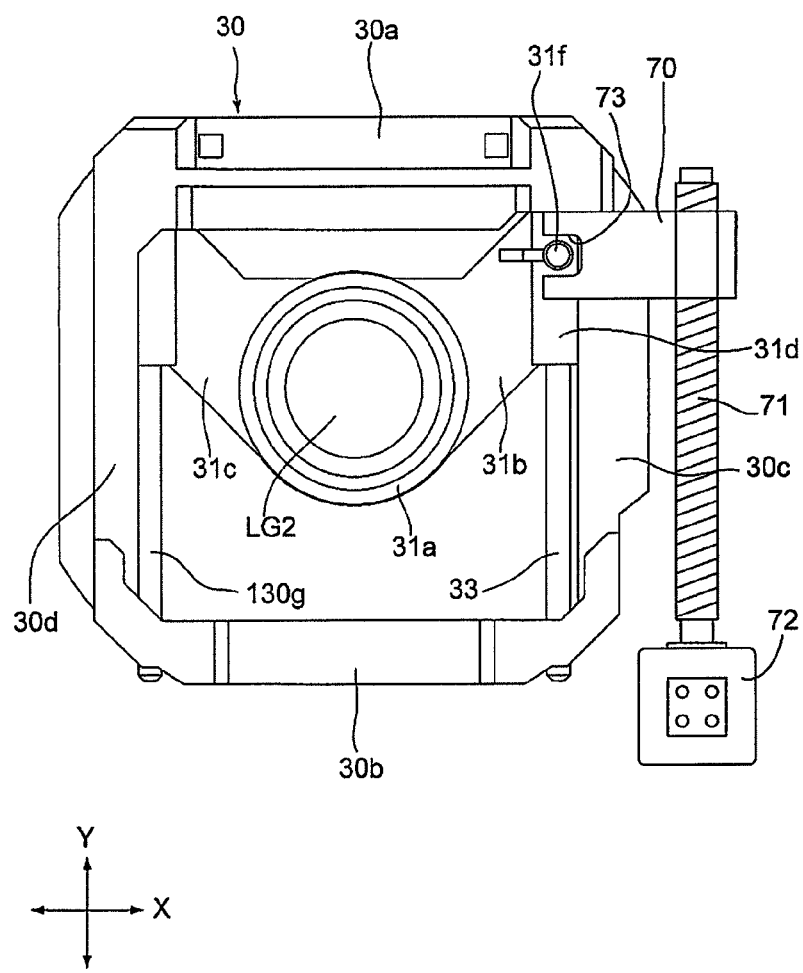
FIG. 26 is a front elevational view of the second lens group support unit of the zoom lens barrel in the ready-to-photograph state, according to a second embodiment.
Figure 27:
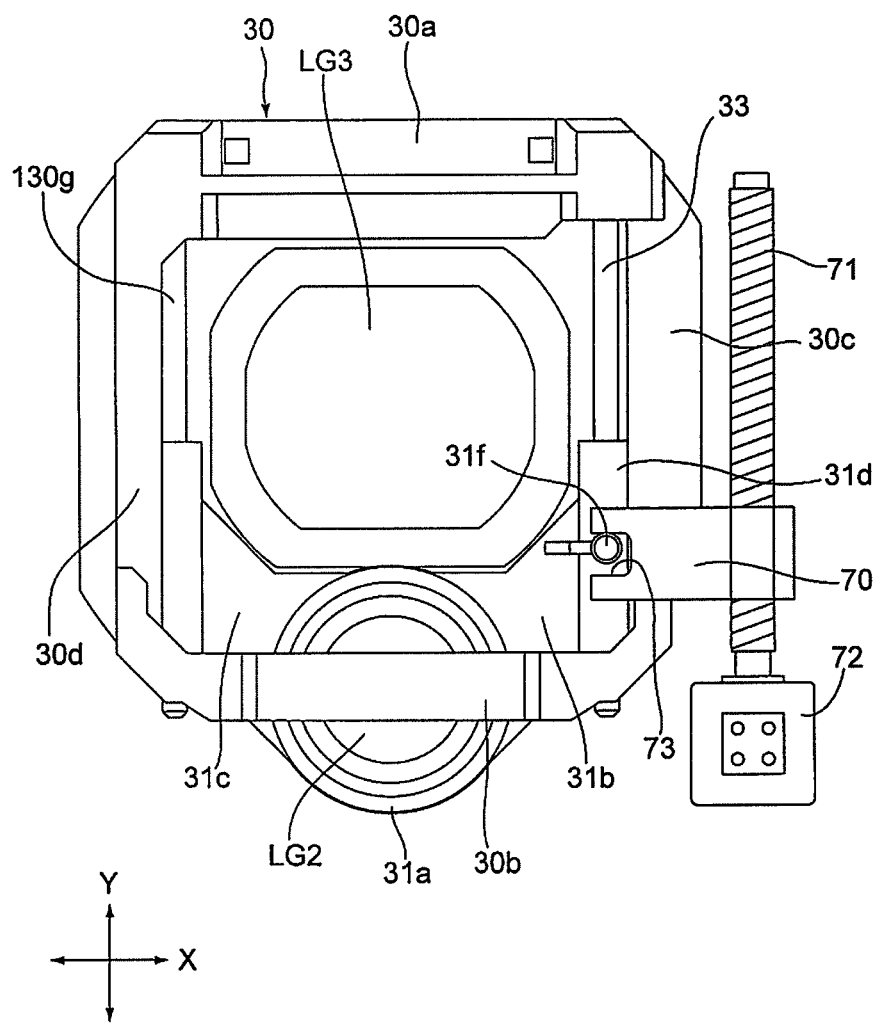
FIG. 27 is a front elevational view of the second lens group support unit of the zoom lens barrel in the accommodated state, according to the second embodiment.

FIGS. 26 and 27 show a second embodiment of the present invention, in which a linear-track insertion/removal-operation member (removal driving member) 70 which linearly moves in the Y-direction is used, instead of the insertion/removal-operation control lever 51 of the first embodiment, as a removal driving member which moves the second movable stage 31 between the anti-shake driving position (on-axis position) and the off-axis position. The structures of the first movable stage 30 and the second movable stage 31 are substantially the same as the first embodiment, except for a separately provided Y-guide shaft 130g serving as a guide portion in the Y-direction of the second movable stage 31 in place of the guide rib 30g that is integrally formed with the first movable stage 30. Likewise, the other unillustrated elements are substantially to the same as the first embodiment, however, the image sensor holder 14 is not provided (does not need to be provided) with the removing-operation control projection 57 because the second movable stage 31 is provided with an insertion/removal-operation driving motor 72 as its own driving source for insertion/removal operation.

The linear-track insertion/removal-operation member 70 is engaged in a feed screw formed on a drive shaft 71 that extends in the Y-direction, and the rotation of the linear-track insertion/removal-operation member 70 around the rotation axis of the drive shaft 71 is prohibited. When the insertion/removal-operation driving motor 72 causes the drive shaft 71 to rotate in the clockwise/counterclockwise directions, the linear-track insertion/removal-operation member 70 moves in the Y-direction along the drive shaft 71. The insertion/removal-operation driving motor 72 and the drive shaft 71 are supported in the second lens group movable ring 25. The linear-track insertion/removal-operation member 70 is provided with an insertion/removal-operation guide groove 73, into which the position control pin 31f is inserted. When the linear-track insertion/removal-operation member 70 moves from the lens-insertion position of FIG. 26 to the removed-lens holding position of FIG. 27, the position control pin 31f is pressed on one side (the upper side surface of FIGS. 26 and 27) of the facing side surfaces of the insertion/removal-operation guide groove 73, whereby the second movable stage 31 moves to the off-axis position. Whereas, when the linear-track insertion/removal-operation member 70 moves from the removed-lens holding position of FIG. 27 to the lens-insertion position of FIG. 26, the position control pin 31f is pressed on the other side (the lower side surface of FIGS. 26 and 27) of the facing side surfaces of the insertion/removal-operation guide groove 73, whereby the second movable stage 31 moves to the anti-shake driving position (on-axis position).

Likewise with the insertion/removal-operation control lever 51 of the first embodiment, according to the linear-track insertion/removal-operation member 70 of the second embodiment, when the second movable stage 31 moves to the off-axis position, although not shown in FIGS. 26 and 27, the contact flange 15g on the front side of the third lens group frame 15 at the rear of the second movable stage 31 comes in slidable contact with the linear-track insertion/removal-operation member 70, rather than with the second movable stage 31 itself, whereby the load on the second movable stage 31 is reduced.

Although the present invention has been discussed with reference to the above described embodiments and the accompanied drawings, the present invention is not limited solely to these particular embodiments; making various modifications is possible without departing from the spirit or essential character thereof. For instance, the zoom lens barrel according to the present embodiments and the accompanied drawings is provided with the anti-shake device which moves the second lens group LG2 in the X-direction and the Y-direction; however, the lens barrel to which the present invention is applied may be sufficient as long as being provided with the removable optical element for carrying out the removal operation out of the optical axis, regardless of the driving manner of the removable optical element in the ready-to-photograph state. For example, an optical element which does not serve as the anti-shake optical element can be applied to the removable optical element of the present invention.

Furthermore, in the zoom lens barrel 10 according to the present embodiments and the accompanied drawings, the second movable stage 31 linearly moves between the anti-shake driving position (on-axis position) and the off-axis position; however, the present invention may also be applied to any lens barrel provided with another off-axis removable member which moves in any manner other than the linear motion, such as rotation about an axis parallel to the optical axis O.

Although the embodiments and the accompanied drawings show examples of application to the zoom lens barrel, the present invention may also be applied to any single focus lens system as long as such a lens system has a ready-to-photograph state and an accommodated state.

According to the embodiments and the accompanied drawings, the optical element for removing out of the optical axis and the other optical element at the rear thereof are both the lens groups (LG2, LG3); however, the present invention can be applied to any optical element other than these lens groups.

According to the first embodiment, the second movable stage 31 and the third lens group frame 15 move closer to each other to the positions as shown in FIG. 21, and the slidable contact of the guide projection 51e of the insertion/removal-operation control lever 51 with the guide recess 15h produces the component force in the departing directions, whereby the insertion/removal-operation control lever 51 is inserted into the front side of the contact flange 15g. As an alternative to the first embodiment, it is possible for the insertion/removal-operation control lever 51 to have a structure in which the insertion/removal-operation control lever 51 is already in contact with the contact flange 15g in the initial state when the second movable stage 31 and the third lens group frame 15 moves closer to each other in order to achieve the state shown FIG. 22 without requiring to pass through the state shown in FIG. 21. In this structure, the forming area of the contact flange 15g and the installation position of the insertion/removal-operation control lever 51 can be appropriately modified so that the insertion/removal-operation control lever 51 is capable of contacting the contact flange 15g (positioned on the elongated line in the optical axis direction) when the insertion/removal-operation control lever 51 is at the insertion position shown in FIGS. 9 and 13. For example, when the second lens group support unit 26 is in the ready-to-photograph state, the positional relationship between the insertion/removal-operation control lever 51 and the contact flange 15g as shown in FIG. 22 would cause the insertion/removal-operation control lever 51 to interrupt the light from an object. Therefore, in order to avoid such an interruption, the insertion/removal-operation control lever 51 and the contact flange 15g can be set at positions away from the optical axis O in radial directions compared to the positions of FIG. 22 (i.e., the right side of FIG. 22).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
a rear movable member, which holds a rear optical element of an imaging optical system, said rear movable member being movable along the optical axis of said imaging optical system between a photographing position and a retracted accommodating position that is positioned behind said photographing position;
an off-axis removable member, which holds a removable optical element of said imaging optical system, said off-axis removable member being movable between an on-axis position at which said removable optical element is positioned on said optical axis and an off-axis position at which said removable optical element is positioned radially away from said optical axis;
a front movable member, which supports said off-axis removable member, said front movable member being movable along said optical axis between a photographing position and a retracted accommodating position that is positioned behind said photographing position; and
a removal driving member, which is supported by said front movable member, wherein said removal driving member makes said off-axis removable member position at said on-axis position when said front movable member is at said photographing position, and said removal driving member moves said off-axis removable member from said on-axis position to said off-axis position when said front movable member moves from said photographing position to said retracted accommodating position;
wherein, when said front movable member and said rear movable member are respectively positioned at said photographing positions, said removable optical element is positioned in front of said rear optical element, and when said front movable member and said rear movable member are respectively positioned at said retracted accommodating positions, said removable optical element at least partially overlaps said rear optical element in the optical axis direction;
wherein said removal driving member is provided at the rear of said front movable member; and
wherein when said front movable member moves rearward in the optical axis direction relative to said rear movable member, said removal driving member comes in contact with said rear movable member to be slidable in a driven direction of said off-axis removable member within a movable range of said off-axis removable member between said on-axis position and said off-axis position, while said off-axis removable member does not come in contact with said rear movable member.

2. The lens barrel according to claim 1, wherein said removal driving member comprises a swing member which is supported by said front movable member and pivoted about an axis that is substantially parallel to said optical axis.

3. The lens barrel according to claim 1, wherein said removal driving member comprises a linear movable member which is supported by said front movable member to be movable linearly in a direction that is substantially orthogonal to said optical axis.

4. The lens barrel according to claim 1, wherein said rear movable member is provided with a holding frame which holds said rear optical element, and
wherein said holding frame of said rear movable member is provided with a contact portion which projects forwardly in the optical axis direction and is formed along a moving path of said removal driving member to be capable of coming in contact with said removal driving member.

5. The lens barrel according to claim 4, wherein said contact portion of said holding frame comprises a flange portion projecting forwardly in the optical axis direction from a rim of said holding frame, and
wherein said removal driving member is provided with a rear flat surface that is substantially orthogonal to said optical axis and faces said flange portion of said rear movable member when said off-axis removable member moves from said on-axis position to said off-axis position.

6. The lens barrel according to claim 4, wherein said removal driving member does not coincide with said contact portion, as viewed in the optical axis direction, when said off-axis removable member is at said on-axis position so that said removal driving member does not prevent said off-axis removable member and said rear movable member from closely approaching each other in the optical axis direction; and
wherein at least one of said removal driving member and said rear movable member is provided with a guide portion, wherein said guide portion guides said removal driving member to insert between said off-axis removable member and said rear movable member to a position so as to face said contact portion by widening a distance between said off-axis removable member and said rear movable member in the optical axis direction, when said removal driving member moves said off-axis removable member from said on-axis position toward said off-axis position in a state where said off-axis removable member and said rear movable member are positioned at the closest position to each other in the optical axis direction.

7. The lens barrel according to claim 6, wherein said guide portion is provided with a tapered surface which is provided on said holding frame of said rear movable member, said tapered surface producing a component force to press said rear movable member rearward in the optical axis direction by movement of said removal driving member from one position, that makes said off-axis removable member position at said on-axis position, to another position, that makes said off-axis removable member position at said off-axis position.

8. The lens barrel according to claim 1, wherein one of said removal driving member and said off-axis removable member is provided with a projection which projects in the optical axis direction, and the other of said removal driving member and said off-axis removable member is provided with a groove into which said projection is inserted so as to transmit a moving force in the direction orthogonal to the optical axis while not transmitting a moving force in the optical axis direction, and
wherein a driving force from said removal driving member to said off-axis removable member is applied via said projection and said groove.

9. The lens barrel according to claim 1, wherein each of said removable optical element and said rear optical element is a lens group.

\* \* \* \* \*